(12) United States Patent
Taherzadeh Boroujeni et al.

(10) Patent No.: US 12,328,718 B2
(45) Date of Patent: Jun. 10, 2025

(54) PRIORITIZING OR DEPRIORITIZING REPEATED CONTROL CHANNEL

(71) Applicant: QUALCOMM Incorporated, San Diego, CA (US)

(72) Inventors: Mahmoud Taherzadeh Boroujeni, San Diego, CA (US); Tao Luo, San Diego, CA (US); Junyi Li, Fairless Hills, PA (US); Juan Montojo, San Diego, CA (US); Jelena Damnjanovic, Del Mar, CA (US); Wooseok Nam, San Diego, CA (US); Jing Sun, San Diego, CA (US); Yan Zhou, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 17/709,149

(22) Filed: Mar. 30, 2022

(65) Prior Publication Data
US 2022/0322392 A1 Oct. 6, 2022

Related U.S. Application Data

(60) Provisional application No. 63/170,417, filed on Apr. 2, 2021, provisional application No. 63/168,908, filed on Mar. 31, 2021.

(51) Int. Cl.
*H04W 72/1268* (2023.01)
*H04L 1/18* (2023.01)
*H04L 5/00* (2006.01)
*H04W 72/21* (2023.01)
*H04W 72/566* (2023.01)

(52) U.S. Cl.
CPC .......... *H04W 72/1268* (2013.01); *H04L 1/18* (2013.01); *H04L 5/0053* (2013.01); *H04W 72/21* (2023.01); *H04W 72/569* (2023.01)

(58) Field of Classification Search
CPC ...... H04L 1/18; H04L 5/0053; H04W 72/569; H04W 72/21; H04W 72/1268
See application file for complete search history.

(56) References Cited

U.S. PATENT DOCUMENTS

2020/0259625 A1* 8/2020 Papasakellariou ... H04B 7/0456
2021/0184812 A1* 6/2021 MolavianJazi ....... H04L 1/0041

FOREIGN PATENT DOCUMENTS

WO WO-2020041269 A1 * 2/2020

* cited by examiner

*Primary Examiner* — Elton Williams
(74) *Attorney, Agent, or Firm* — Patterson+ Sheridan, L.L.P.

(57) ABSTRACT

Certain aspects of the present disclosure provide techniques for a method for wireless communication by a user-equipment (UE). The method generally includes receiving, on a control channel, a configuration for an uplink control information (UCI) repetition, determining, in dependence on the control channel, whether to prioritize transmission of the UCI repetition over other uplink signaling, wherein a scheduled resource for transmission of the UCI repetition overlaps with resources for the other uplink signaling, and taking one or more actions associated with communication of the UCI repetition in accordance with the determination.

22 Claims, 15 Drawing Sheets

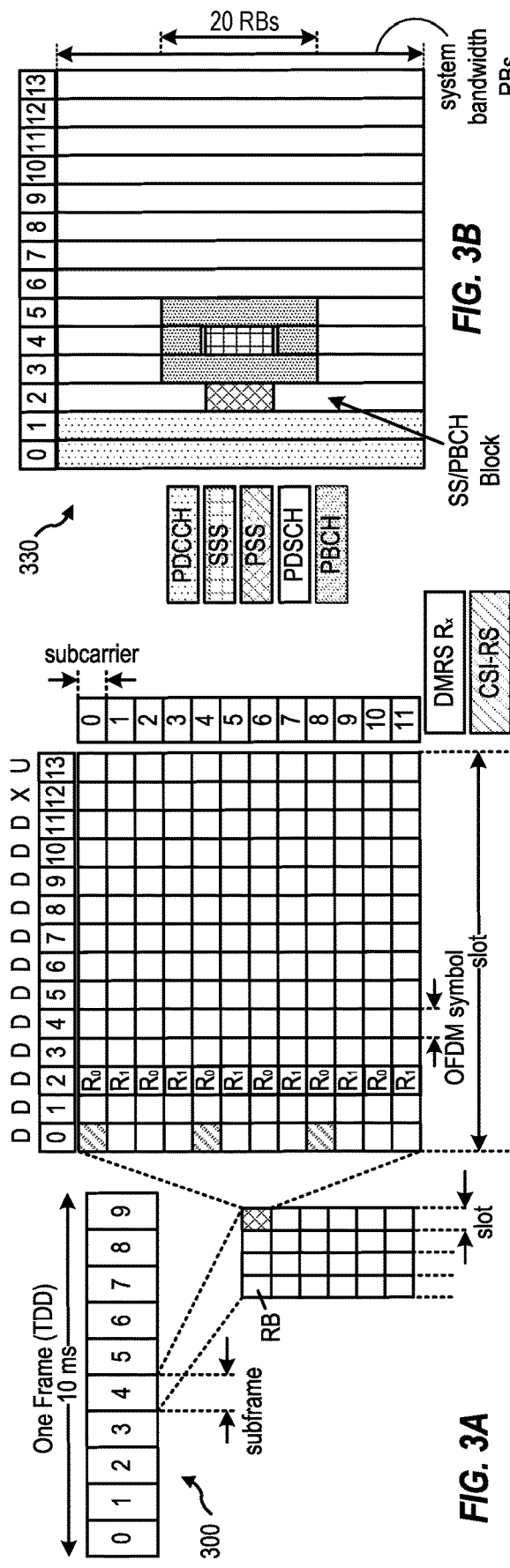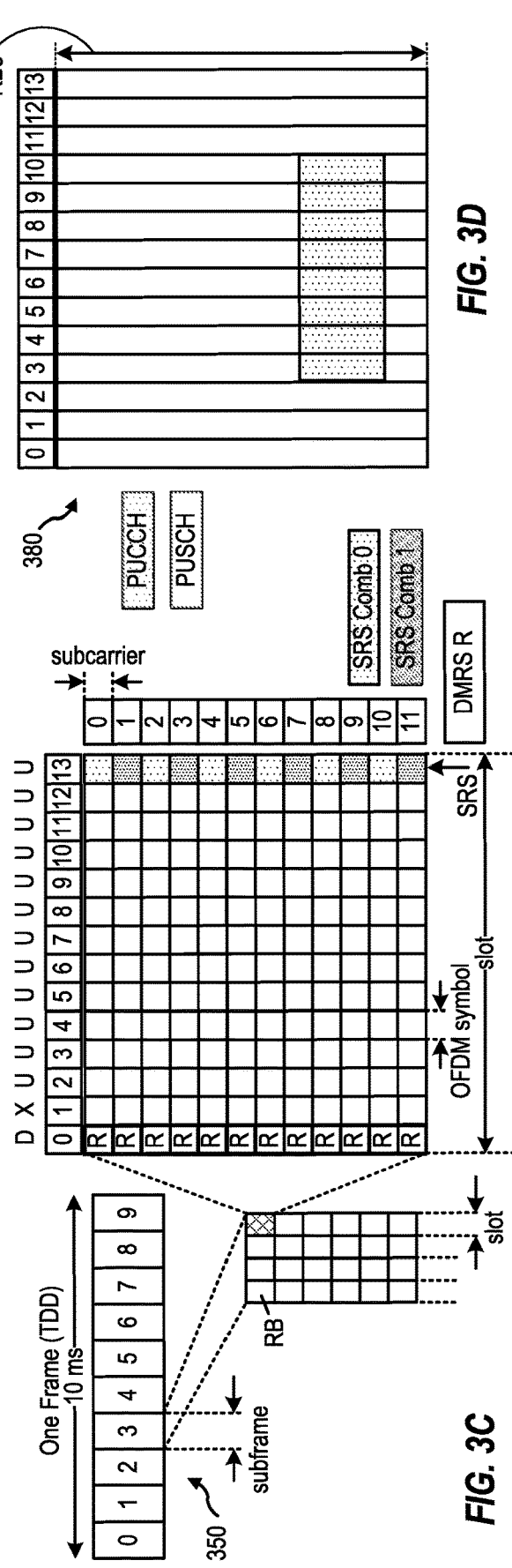

PRIORITIZING OR DEPRIORITIZING REPEATED CONTROL CHANNEL

CROSS REFERENCE TO RELATED APPLICATIONS

This application claims benefit of and priority to U.S. Provisional Patent Application Nos. 63/168,908, filed on Mar. 31, 2021, and 63/170,417, filed on Apr. 2, 2021, which are assigned to the assignee hereof and herein incorporated by reference in their entirety as if fully set forth below and for all applicable purposes.

INTRODUCTION

Aspects of the present disclosure relate to wireless communications, and more particularly, to techniques for repetition of a control channel.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects of the present disclosure provide techniques for a method for wireless communication by a user-equipment (UE). The method generally includes receiving, on a control channel, a configuration for an uplink control information (UCI) repetition, determining, in dependence on the control channel, whether to prioritize transmission of the UCI repetition over other uplink signaling, wherein a scheduled resource for transmission of the UCI repetition overlaps with resources for the other uplink signaling, and taking one or more actions associated with communication of the UCI repetition in accordance with the determination.

Certain aspects of the present disclosure provide techniques for a method for wireless communication by a user equipment (UE). The method generally includes transmitting, on a control channel, a configuration for an uplink control information (UCI) repetition, the control channel indicating whether to prioritize transmission of the UCI repetition over other uplink signaling, wherein a scheduled resource for transmission of the UCI repetition overlaps with resources for the other uplink signaling; and taking one or more actions associated with communication of the UCI repetition in accordance with the indication on the control channel.

In some aspects, a user equipment (UE) for wireless communication includes at least one processor and at least one memory communicatively coupled with the at least one processor and storing processor-readable code that, when executed by the at least one processor, is configured to cause the UE to receive an indication of a first uplink control channel resource associated with a semi-persistent scheduling (SPS) occasion. The processor-readable code that, when executed by the at least one processor, is configured to cause the UE to receive a dynamic indication of one or more repetitions of an uplink control channel message, wherein a second uplink control channel resource of a repetition, of the one or more repetitions, at least partially overlaps in a time domain with the first uplink control channel resource. The processor-readable code that, when executed by the at least one processor, is configured to cause the UE to transmit uplink control information using only one of the first uplink control channel resource or the second uplink control channel resource based at least in part on a first priority level of the SPS occasion and a second priority level of a downlink message associated with the uplink control channel message.

In some aspects, a base station for wireless communication includes at least one processor and at least one memory communicatively coupled with the at least one processor and storing processor-readable code that, when executed by the at least one processor, is configured to cause the base station to transmit an indication of a first uplink control channel resource associated with an SPS occasion. The processor-readable code that, when executed by the at least one processor, is configured to cause the base station to transmit a dynamic indication of one or more repetitions of an uplink control channel message, wherein a second uplink control channel resource associated with a repetition, of the one or more repetitions, at least partially overlaps in a time domain with the first uplink control channel resource. The processor-readable code that, when executed by the at least one processor, is configured to cause the base station to receive uplink control information using only one of the first uplink control channel resource or the second uplink control channel resource based at least in part on a first priority level of the SPS occasion and a second priority level of a downlink message associated with the uplink control channel message.

In some aspects, a method of wireless communication performed by a UE includes receiving an indication of a first uplink control channel resource associated with an SPS occasion. In some aspects, the method includes receiving a dynamic indication of one or more repetitions of an uplink control channel message, wherein a second uplink control channel resource of a repetition, of the one or more repetitions, at least partially overlaps in a time domain with the first uplink control channel resource. In some aspects, the method includes transmitting uplink control information using only one of the first uplink control channel resource or the second uplink control channel resource based at least in part on a first priority level of the SPS occasion and a second priority level of a downlink message associated with the uplink control channel message.

In some aspects, a method of wireless communication performed by a base station includes transmitting an indication of a first uplink control channel resource associated with an SPS occasion. In some aspects, the method includes transmitting a dynamic indication of one or more repetitions of an uplink control channel message, wherein a second uplink control channel resource associated with a repetition, of the one or more repetitions, at least partially overlaps in a time domain with the first uplink control channel resource. In some aspects, the method includes receiving uplink control information using only one of the first uplink control channel resource or the second uplink control channel resource based at least in part on a first priority level of the SPS occasion and a second priority level of a downlink message associated with the uplink control channel message.

In some aspects, a non-transitory computer-readable medium storing a set of instructions for wireless communication includes one or more instructions that, when executed by one or more processors of a UE, cause the UE to receive an indication of a first uplink control channel resource associated with an SPS occasion. The one or more instructions that, when executed by one or more processors of the UE, cause the UE to receive a dynamic indication of one or more repetitions of an uplink control channel message, wherein a second uplink control channel resource of a repetition, of the one or more repetitions, at least partially overlaps in a time domain with the first uplink control channel resource. The one or more instructions that, when executed by one or more processors of the UE, cause the UE to transmit uplink control information using only one of the first uplink control channel resource or the second uplink control channel resource based at least in part on a first priority level of the SPS occasion and a second priority level of a downlink message associated with the uplink control channel message.

In some aspects, a non-transitory computer-readable medium storing a set of instructions for wireless communication includes one or more instructions that, when executed by one or more processors of a base station, cause the base station to transmit an indication of a first uplink control channel resource associated with an SPS occasion. The one or more instructions that, when executed by one or more processors of the base station, cause the base station to transmit a dynamic indication of one or more repetitions of an uplink control channel message, wherein a second uplink control channel resource associated with a repetition, of the one or more repetitions, at least partially overlaps in a time domain with the first uplink control channel resource. The one or more instructions that, when executed by one or more processors of the base station, cause the base station to receive uplink control information using only one of the first uplink control channel resource or the second uplink control channel resource based at least in part on a first priority level of the SPS occasion and a second priority level of a downlink message associated with the uplink control channel message.

In some aspects, an apparatus for wireless communication includes means for receiving an indication of a first uplink control channel resource associated with an SPS occasion. In some aspects, the apparatus includes means for receiving a dynamic indication of one or more repetitions of an uplink control channel message, wherein a second uplink control channel resource of a repetition, of the one or more repetitions, at least partially overlaps in a time domain with the first uplink control channel resource. In some aspects, the apparatus includes means for transmitting uplink control information using only one of the first uplink control channel resource or the second uplink control channel resource based at least in part on a first priority level of the SPS occasion and a second priority level of a downlink message associated with the uplink control channel message.

In some aspects, an apparatus for wireless communication includes means for transmitting an indication of a first uplink control channel resource associated with an SPS occasion. In some aspects, the apparatus includes means for transmitting a dynamic indication of one or more repetitions of an uplink control channel message, wherein a second uplink control channel resource associated with a repetition, of the one or more repetitions, at least partially overlaps in a time domain with the first uplink control channel resource. In some aspects, the apparatus includes means for receiving uplink control information using only one of the first uplink control channel resource or the second uplink control information using only one of the first uplink control channel resource or the second uplink control channel resource based at least in part on a first priority level of the SPS occasion and a second priority level of a downlink message associated with the uplink control channel message.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for prioritization of a repetition for an uplink control channel.

Certain transmissions, such as uplink control channels, may be sent with repetition to improve coverage and increase reliability. In some scenarios, however, a scheduled uplink control channel repetition may be dropped. For example, a scheduled uplink control channel repetition may be dropped due to a collision (e.g., overlapping) of resources with some other scheduled uplink signaling (e.g., another uplink control channel). In such cases, there may be some ambiguity regarding which of the colliding transmission should be dropped, which may lead to reduced performance (e.g., if a base station is expecting one channel to be dropped, while a UE drops another channel).

Aspects of the present disclosure provide mechanisms for defining a priority to certain uplink control channel transmissions, which may help remove this ambiguity. For example, a configuration may assign a higher priority to certain types of uplink control information (UCI) over other uplink signaling. One potential benefit of this approach is that both a transmitting user equipment (UE) and a network entity (e.g., a base station such as a gNB) may be aligned regarding which transmission will be dropped in the event of a collision.

Introduction to Wireless Communication Networks

Figure 1:
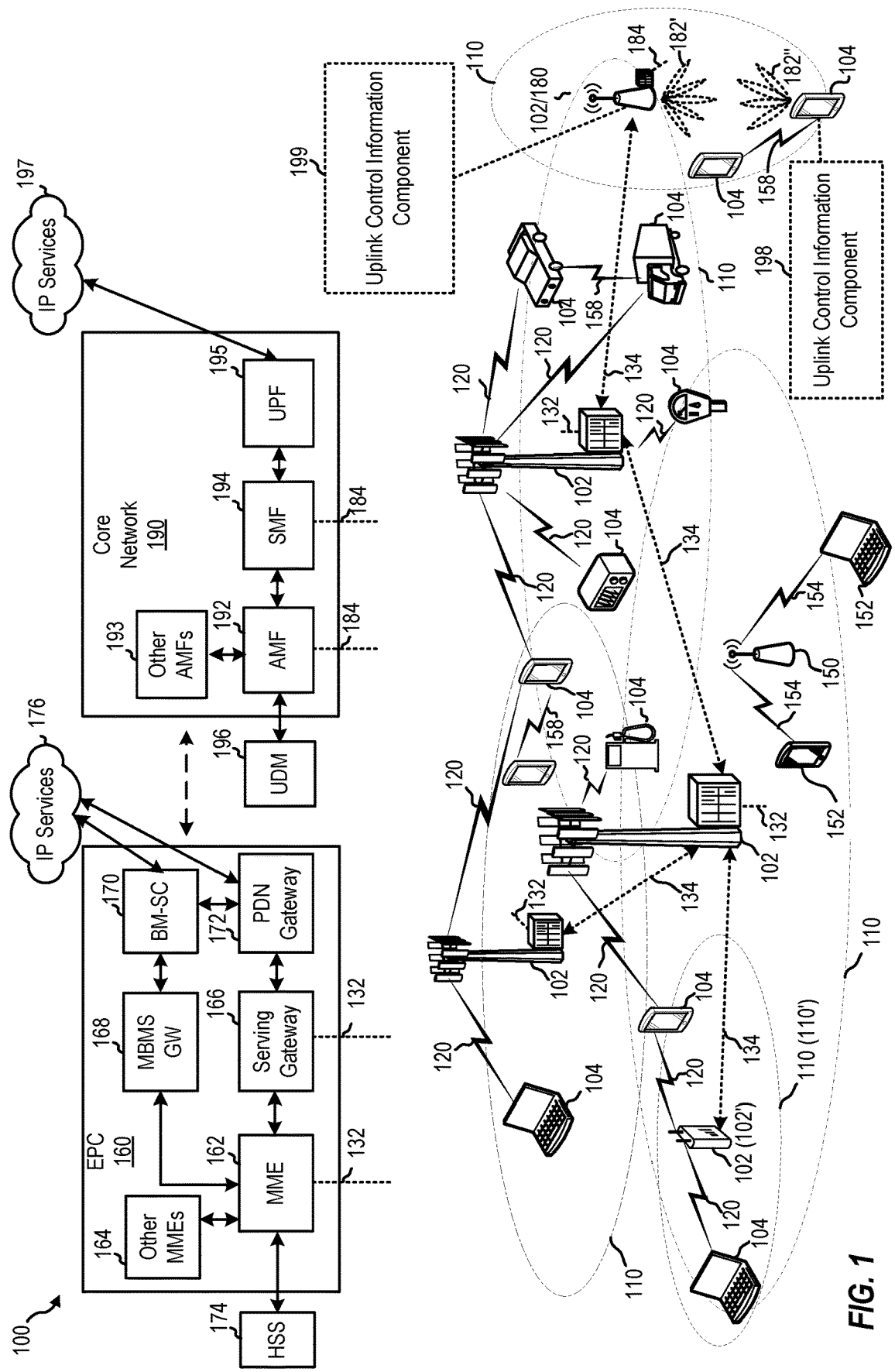
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, an Evolved Packet Core (EPC) 160, and core network 190 (e.g., a 5G Core (5GC)), which interoperate to provide wireless communications services. In some cases, rather than a conventional (aggregated or monlithic base station), similar functionality may be performed by some other type of network entity. Such a network entity can be implemented as a disaggregated base station, an integrated access and backhaul (IAB) node, a relay node, or a sidelink node. In a disaggregated base station architecture, the network entity may include one or more of a central unit (CU), a distributed unit (DU), a radio unit (RU), a Near-Real Time (Near-RT) RAN, Intelligent Controller (MC), or a Non-Real Time (Non-RT) MC.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (MM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes uplink control information component 199, which may be configured to prioritize or deprioritize communication of an uplink control channel repetition. Wireless network 100 further includes uplink control information component 198, which may be configured to prioritize or deprioritize communication of an uplink control channel repetition.

Figure 2:
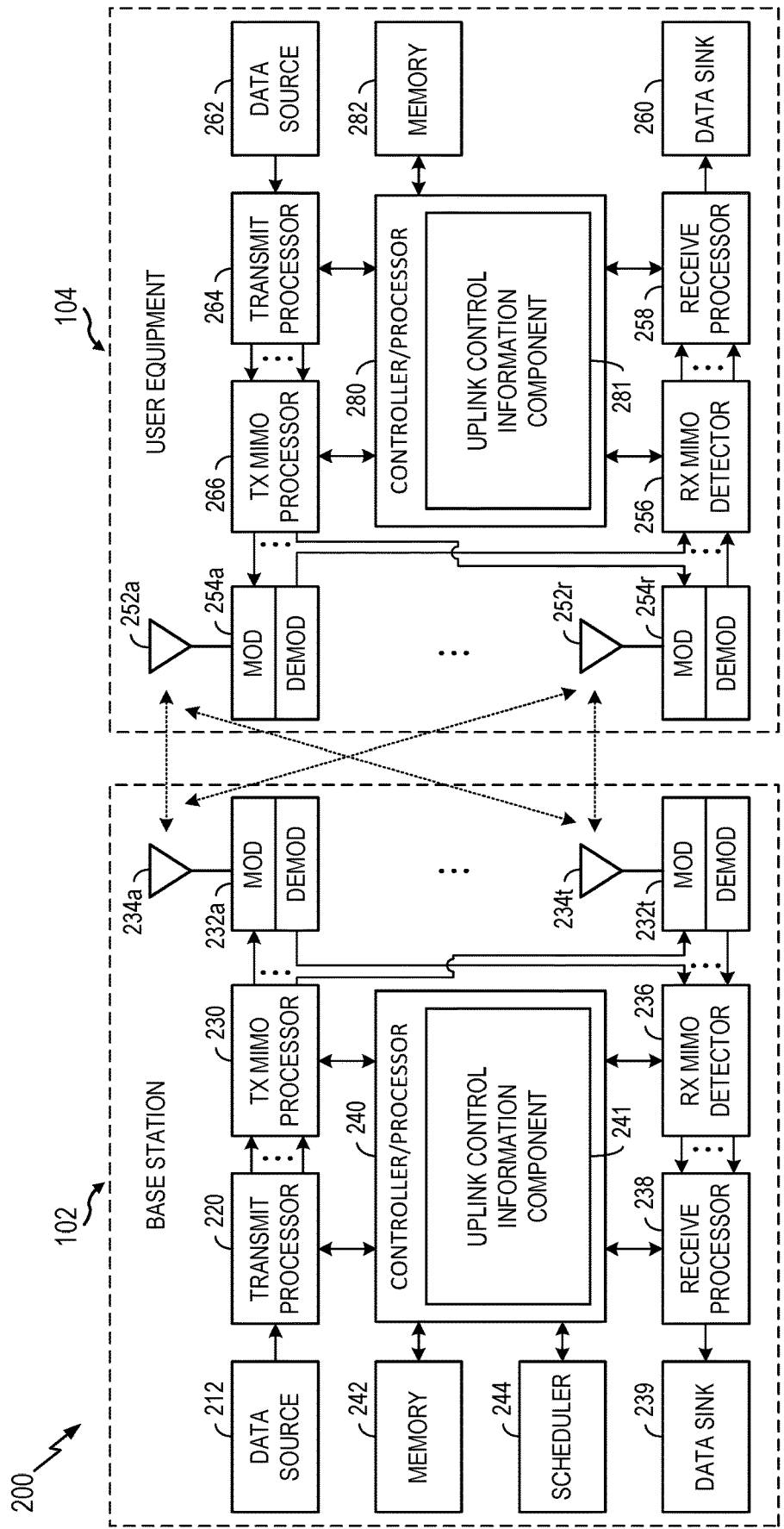
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212)

and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes uplink control information component 241, which may be representative of uplink control information component 199 of FIG. 1. Notably, while depicted as an aspect of controller/processor 240, uplink control information component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes uplink control information component 281, which may be representative of uplink control information component 198 of FIG. 1. Notably, while depicted as an aspect of controller/processor 280, uplink control information component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Aspects Related to Uplink Control Channel Repetition on an Uplink Data Channel

Some aspects of the present disclosure are directed to prioritization of a repetition for an uplink control channel (e.g., a physical uplink control channel (PUCCH)). A signaling mechanism may be used to support a dynamic indication of an uplink control channel repetition factor. The uplink control channel repetition factor may be included in downlink control information (DCI). The uplink control channel repetition factor may indicate whether a control channel should be repeated, as well as other information such as the number of repetitions to be used. In some implementations, demodulation reference signal (DMRS) bundling across control channel repetitions may be used to enhance coverage.

Uplink control channel repetition (e.g., with dynamic indication) may collide with other uplink signaling resources (e.g., for another uplink control channel). In other words, the resources scheduled for an uplink control channel repetition may at least partially overlap with resources of other uplink signaling. As a result, the scheduled uplink control channel repetition may be dropped.

Some aspects of the present disclosure are directed to techniques for handling scenarios where transmission of the uplink control channel repetition may be dropped due to, for example, collision of the uplink control channel repetition with other uplink signaling. For example, a UE may prioritize or deprioritize transmission of the uplink control channel repetition based on various rules provided herein.

Figure 4:
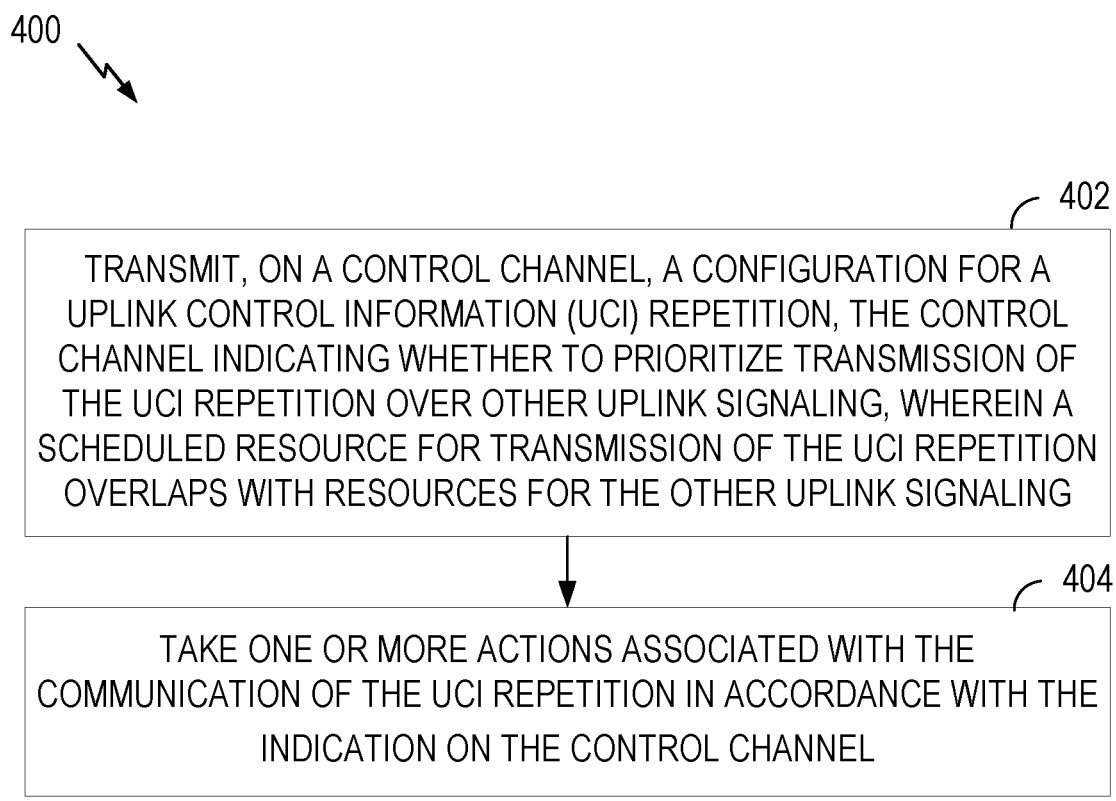
FIG. 4 is a flow diagram illustrating example operations for wireless communication by a network entity, in accordance with certain aspects of the present disclosure.

FIG. 4 is a flow diagram illustrating example operations 400 for wireless communication, in accordance with certain aspects of the present disclosure. The operations 400 may be performed, for example, by a network entity (e.g., such as the BS 102 in the wireless communication network 100 or one or more components of a disaggregated base station).

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at block 402, with the BS transmitting, on a control channel, a configuration for an uplink control information (UCI) repetition (e.g., also referred to as an uplink control channel repetition, or a repetition of an uplink control channel), the control channel indicating whether to prioritize transmission of the UCI repetition over other uplink signaling. A scheduled resource for transmission of the UCI repetition may overlap with resources for the other uplink signaling. At block 404, the BS may take one or more actions associated with the communication of the UCI repetition in accordance with the indication on the control channel.

Figure 5:
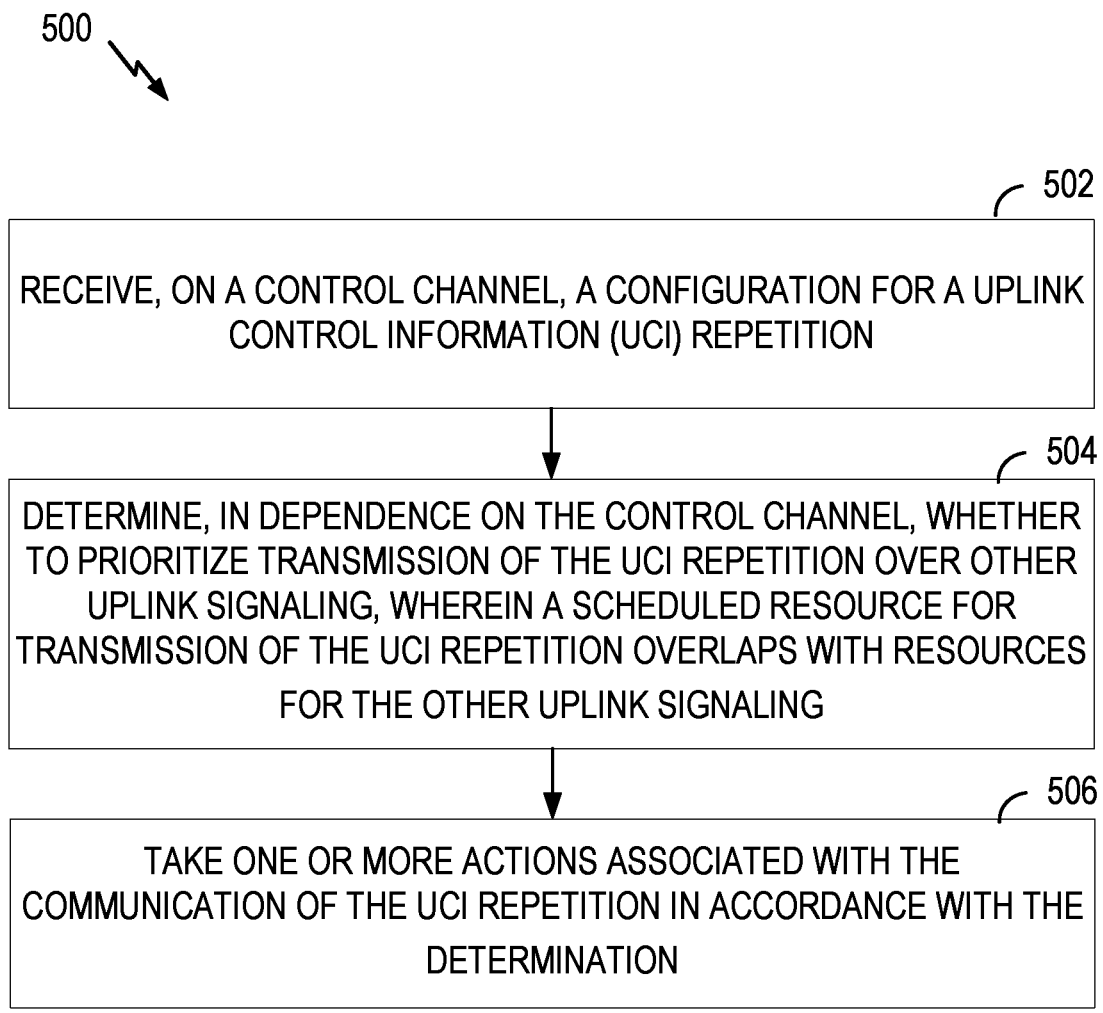
FIG. 5 is a flow diagram illustrating example operations for wireless communication by a user-equipment, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 104a in the wireless communication network 100).

The operations 500 may be complimentary operations by the UE to the operations 400 performed by the BS. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 begin, at block 502, with the UE receiving, on a control channel, a configuration for a UCI repetition. At block 504, the UE may determine, in dependence on the control channel, whether to prioritize transmission of the UCI repetition over other uplink signaling. A scheduled resource for transmission of the UCI repetition may overlap with resources for the other uplink signaling. The other uplink signaling may be on another uplink control channel.

In some aspects, the control channel may include an indication to prioritize the UCI repetition over the other uplink signaling. The determining of whether to prioritize the transmission may be based the indication.

In some aspects, the UCI repetition may include a repetition of UCI having an acknowledgement (ACK) or negative acknowledgement (NACK) for a downlink data channel. The determining of whether to prioritize the transmission may be further based on a priority associated the downlink data channel. For example, the priority associated the downlink data channel may include a priority associated with a logical channel for the downlink data channel.

The determining of whether to prioritize the transmission may include determining to prioritize the UCI repetition based on the priority of the data channel being the same as a priority of the other uplink signaling. The other uplink signaling may include other UCI for another downlink data channel, and the priority of the other uplink signaling may include a priority of the other downlink data channel.

In some aspects, the UE may receive a configuration for semi-persistent scheduling (SPS) for another downlink data channel. The other uplink signaling may be on another control channel for the other downlink data channel, and the determining of whether to prioritize the transmission may include determining whether to prioritize the UCI repetition based on the configuration for the SPS. The other uplink signaling on the other control channel may include ACK or NACK for the other downlink data channel.

At block 506, the UE may take one or more actions associated with the communication of the UCI repetition in accordance with the determination. In some cases, taking the one or more actions may include deferring transmission of the UCI repetition based on the determination to not prioritize the UCI repetition over the other uplink signaling. In some aspects, taking the one or more actions may include transmitting the UCI repetition using a resource that is non-overlapping with a resource used for transmission of other UCI. The operations 500 are described in more detail with respect to FIGS. 6-8.

Figure 6:
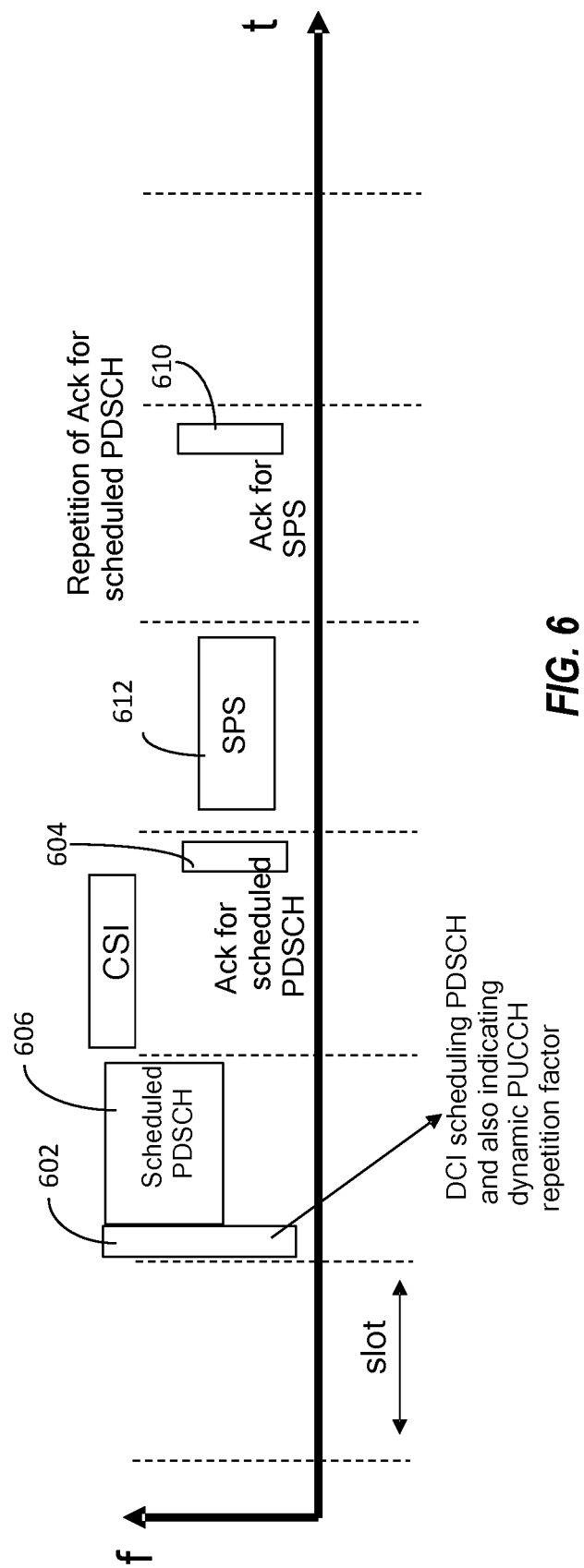
FIGS. 6 and 7 illustrate example scenarios resulting in collision of resources scheduled for uplink signaling, in accordance with certain aspects of the present disclosure.
Figure 7:
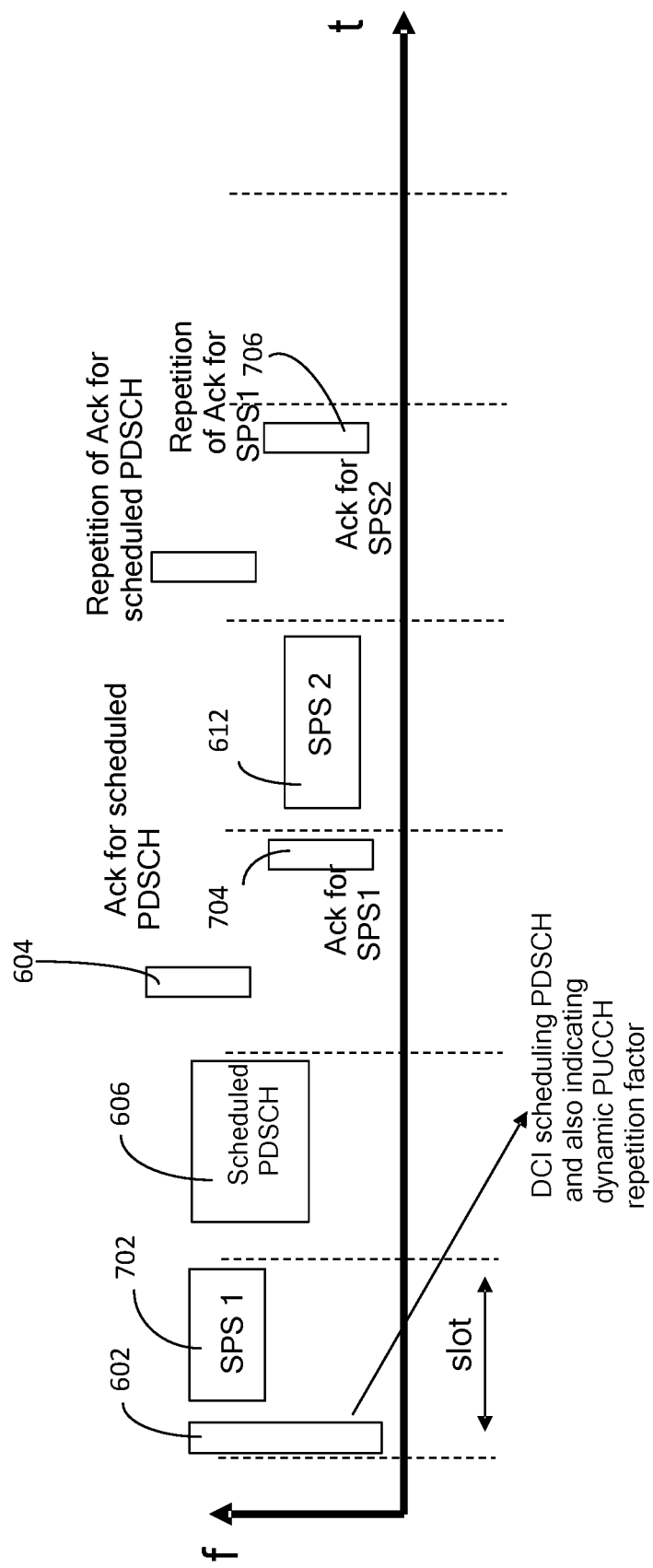

FIGS. 6 and 7 illustrate example scenarios resulting in collision of resources scheduled for uplink signaling, in accordance with certain aspects of the present disclosure. As shown in FIG. 6, a UE may receive DCI 602 which schedules a downlink data channel 606 (e.g., PDSCH), and may also include a dynamic uplink control channel (e.g., PUCCH) repetition factor for the downlink data channel 606. For example, the DCI 602 may indicate whether an uplink control channel 604 (e.g., PUCCH) used to provide ACK or ACK for downlink data channel 606 is to be repeated (e.g., as well as a number of repetitions to be used). If repetition for uplink control channel 604 is activated, resources 610 may be configured for the repetition. Moreover, one or more SPS transmissions (e.g., PDSCH) may be preconfigured via RRC signaling. For example, the UE may receive the SPS transmission 612, and the uplink control channel (e.g., PUCCH) for ACK or NACK of the SPS transmission 612 may also be configured using resources 610. In other words, the resources configured for the repetition of uplink control channel 604 and ACK/NACK for SPS transmission 612 may collide.

As shown in FIG. 7, a UE may be configured with multiple SPS configurations. For example, the UE may receive the SPS transmission 702 and transmit an uplink control channel 704 for ACK/NACK for the SPS transmission 702. The resources 706 may be configured for both the repetition of the uplink control channel 704 and the ACK/NACK for the SPS transmission 612. Therefore, resources scheduled for the repetition of the uplink control channel 704 and resources scheduled for ACK/NACK for the SPS transmission 612 may collide.

Figure 8:
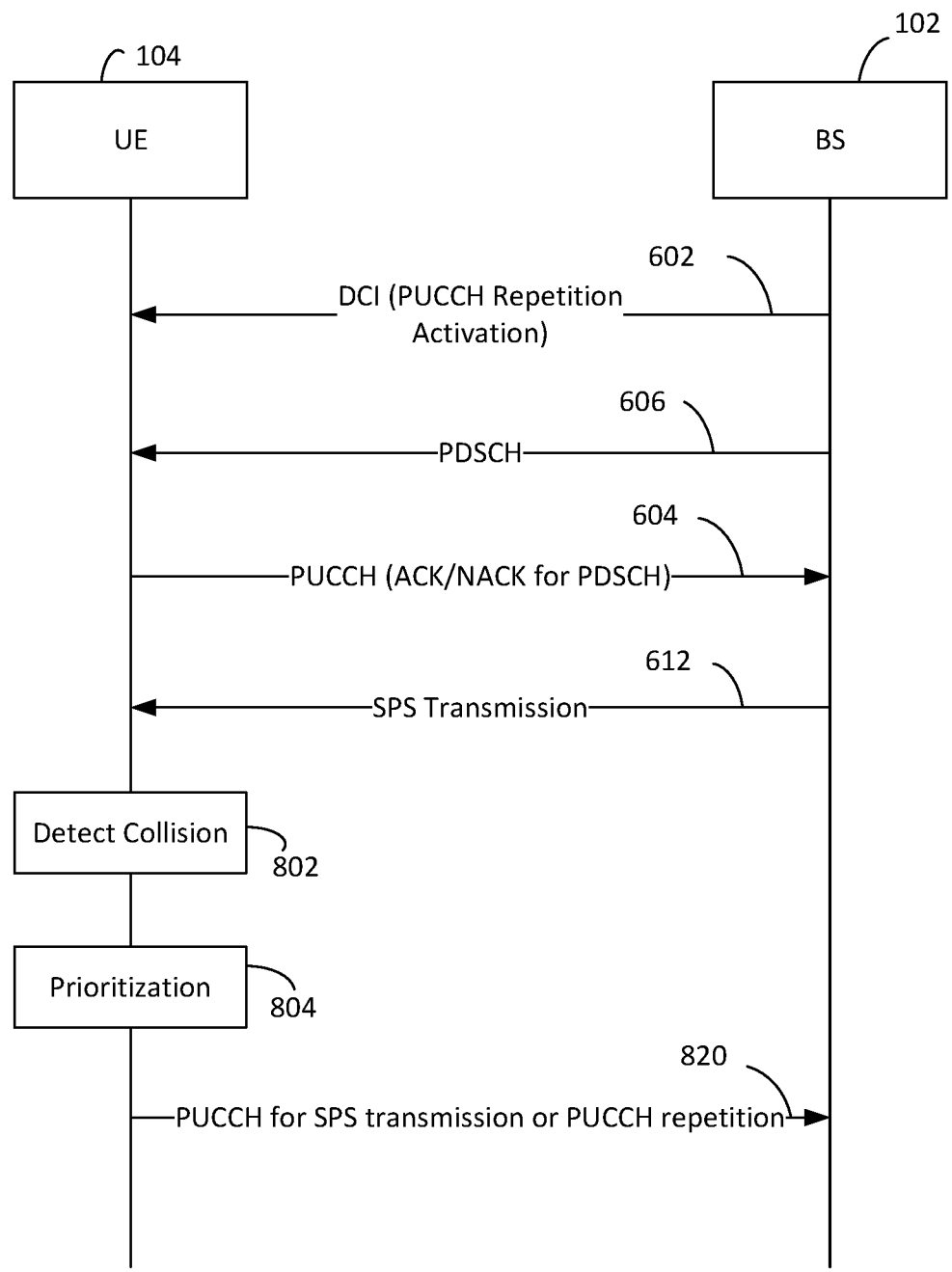
FIG. 8 illustrates prioritization techniques for uplink control channel repetition, in accordance with certain aspects of the present disclosure.

FIG. 8 illustrates example techniques for prioritization of uplink control channel repetition, in accordance with certain aspects of the present disclosure. In some aspects, a repeated uplink control channel may be prioritized or deprioritized (e.g., in case of collision with resources for another uplink control channel) depending on the dynamic indication (e.g., in DCI 602) of the repetition (or the downlink control channel (PDCCH) carrying the dynamic indication). For example, DCI 602 may schedule the downlink data channel 606 and the uplink control channel 604 for the downlink data channel 606.

As shown, the UE may also receive an SPS transmission 612 having a corresponding uplink control channel. At block 802, the UE may determine that the resources for transmission of the uplink control channel for the SPS transmission 612 collide with resources for repetition of uplink control channel 604, and at block 804, determine which of the control channel transmissions is to be prioritized.

In some aspects, the repetition of uplink control channel 604 may be prioritized over transmission of a control channel for the SPS transmission 612 depending on the dynamic indication in DCI 602 (e.g., when a collision occurs as described with respect to FIGS. 6 and 7). As an example, the DCI 602 may indicate whether the repetition of an uplink control channel (e.g., uplink control channel 604) scheduled on a common resource (e.g., resources 610 or 706) is to be prioritized over transmission of the uplink control channel for the SPS transmission 612. Based on the prioritization decision, the UE may perform a transmission 820 of either the uplink control channel for the SPS transmission 612, or the repetition of the uplink control channel 604.

In some aspects, priority of the repeated uplink control channel (e.g., carrying ACK/NACK for a scheduled downlink data channel (e.g., downlink data channel 606)) over another uplink control channel (e.g., carrying ACK/NACK for another downlink data channel such as SPS transmission 612), may be based on the priority of the associated downlink data channel or the priority of a logical channel of the downlink data channel. For example, the priority associated with repetition of the uplink control channel 604 scheduled on resources 610 may be determined based on a priority of the downlink data channel 606, and the priority of the uplink control channel for the SPS transmission 612 may be determined based on the priority of the SPS transmission 612 (e.g., downlink data channel). The UE may prioritize one of the uplink control channel repetition or uplink control channel for SPS transmission 612 having a higher priority.

In some implementations, for the same priority of downlink data channels, the repeated uplink control channel (e.g., with dynamically indicated repetition factor) may be prioritized. In some cases, for the same priority of downlink data channels, the repeated uplink control channel (e.g., with dynamically indicated repetition factor) may be prioritized or deprioritized compared to regular uplink control channel for SPS transmission (e.g., SPS transmission 612), based on the configuration of the SPS transmission. In other words, the configuration for the SPS transmission (e.g., in radio resource control (RRC) signaling) may include an indication (e.g., a flag) indicating whether uplink control channel for the SPS transmission is to be prioritized (e.g., over other uplink signaling such as the repetition of the uplink control channel 604).

In some aspects, multiplexing of the repeated uplink control channel with other UCI (e.g., on overlapped or same resources) may be blocked, based on standard specification or configuration by the BS. In other words, depending on a configuration indicated from the BS, the UE may not multiplex (e.g., frequency division multiplex, or spatial division multiplex) the uplink control channel repetition with other uplink control information (e.g., control channel for the SPS transmission 612). Multiplexing of an uplink control channel copy with other uplink control information may prevent soft combining at the receiver. Multiplexing of an uplink control channel with other uplink control information causes a transmission using a different codebook, and as a result, the different copies of the uplink control channel cannot be soft combined at the receiver for decoding.

Figure 9:
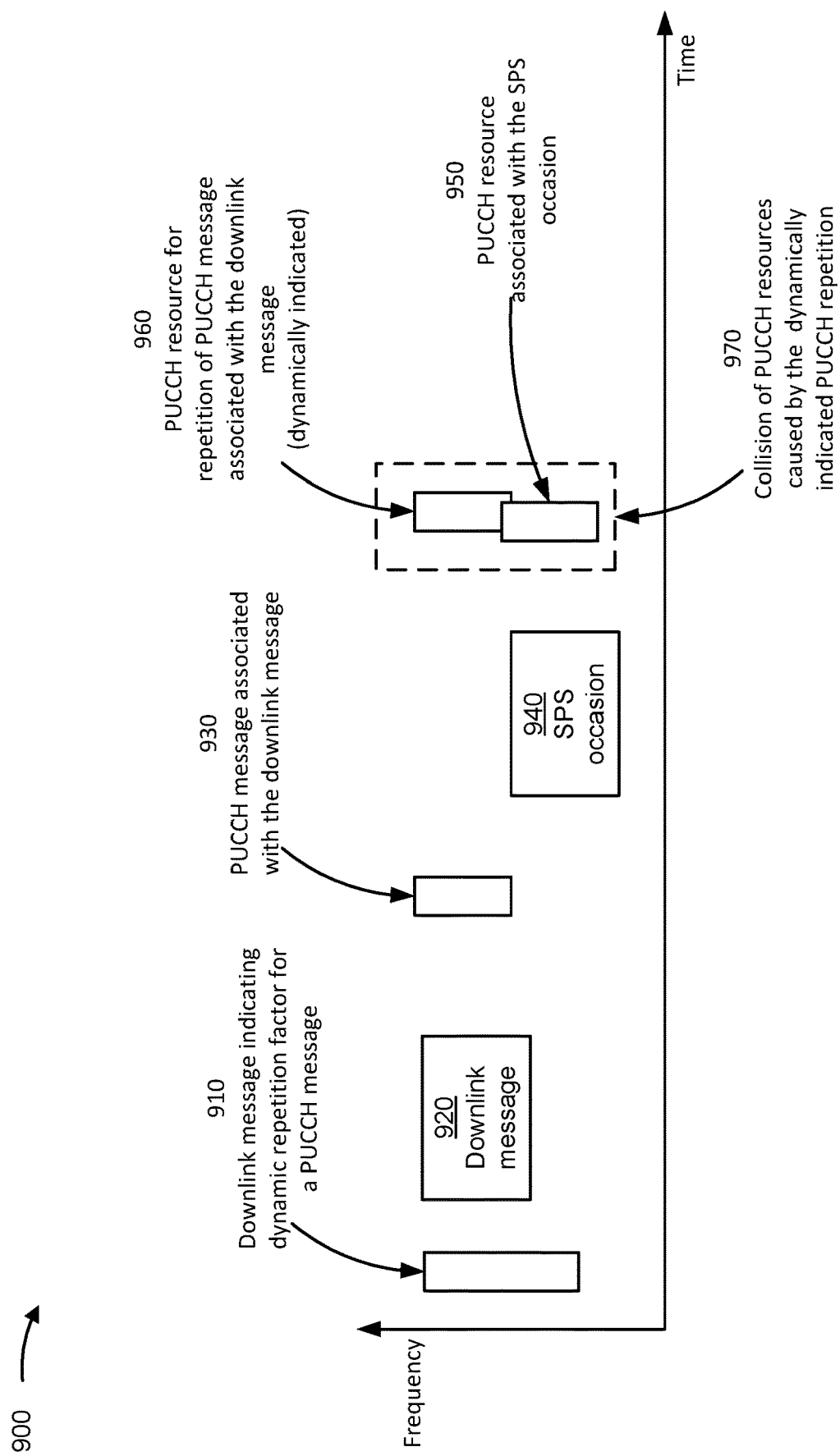
FIG. 9 is a diagram illustrating an example timeline that includes dynamically indicated physical uplink control channel (PUCCH) repetitions, in accordance with the present disclosure.

FIG. 9 is a diagram illustrating an example timeline 900 that includes dynamically indicated PUCCH repetitions, in accordance with the present disclosure. As shown in FIG. 9, a UE 104 may be configured to transmit one or more repetitions of an uplink communication. A repetition, such as an uplink repetition or a downlink repetition, may be used to improve reliability, such as for ultra-reliable low latency communication (URLLC) or for UEs 104 located in a geographic area with poor channel conditions (for example, a cell edge). For example, a UE 104 may be configured to transmit repetitions of an uplink communication (for example, an uplink control channel communication) to enhance coverage of the UE 104.

When repetitions are used, a transmitter repeats transmission of a communication multiple times. For example, a UE 104 may transmit an initial uplink communication and may repeat transmission of (may retransmit) that uplink communication one or more times. When a UE 104 is configured with repetitions, the UE 104 may retransmit an initial transmission without first receiving feedback (for example, an acknowledgement (ACK) or negative acknowledgement (NACK)) indicating whether the initial transmission was successfully received. In some examples, ACK or NACK feedback may be disabled for repetitions, thereby reducing signaling overhead that would otherwise be used for ACK or NACK feedback.

In some cases, a repeated transmission (sometimes referred to as a retransmission) may include the same encoded bits (for example, information bits and parity bits) as the initial transmission or as another repeated transmission (for example, where a same redundancy version is used across repetitions). Alternatively, a repeated transmission may include different encoded bits (for example, a different combination of information bits or parity bits) than the initial transmission or another repeated transmission (for example, where different redundancy versions are used across repetitions).

As used herein, "repetition" may refer to the initial communication and also to a repeated transmission of the initial communication. For example, if the UE 104 is configured to transmit four repetitions, then the UE 104 may transmit an initial transmission and may transmit three repeated transmissions of that initial transmission. Thus, each transmission (regardless of whether the transmission is an initial transmission or a retransmission) is counted as a repetition. A repetition may be transmitted in a transmission occasion, which is sometimes referred to as a transmission instance.

In some cases, an uplink control channel (for example, a physical uplink control channel (PUCCH)) resource may be indicated using a downlink control information (DCI) message. For example, a UE 104 may receive a DCI from a base station 102, and may determine time resources, frequency resources, or code domain resources, among other examples, for a PUCCH transmission based at least in part on the DCI. A base station 102 may communicate with a UE 104 to configure a PUCCH resource set to enable the UE 104 to transmit control signaling to the base station 102 on an uplink. For example, the base station 102 may transmit a system information block (SIB) to the UE 104 to identify a PUCCH resource set in a PUCCH resource set table stored by the UE 104. The PUCCH resource set may include identifiers of a PUCCH format, a first symbol for the PUCCH, a quantity of symbols for the PUCCH, a physical resource block (PRB) offset for the PUCCH, or a set of initial cyclic shift (CS) indices for the PUCCH, among other examples. The DCI message from the base station 102 may identify or indicate a PUCCH resource set configured at the UE 104.

Additionally or alternatively, the UE 104 may receive another message associated with configuring a PUCCH repetition factor. For example, the UE may receive a radio resource control (RRC) message associated with indicating a quantity of repetitions (for example, a repetition factor) of the PUCCH transmission that the UE is to transmit to ensure that, for a set of channel conditions, a reliability criterion is satisfied, or a latency criterion is satisfied, among other examples. As another example, the UE 104 may receive an indication associated with switching a PUCCH format and may determine a quantity of repetitions for a PUCCH (for example, a PUCCH repetition factor) when switching the PUCCH format.

However, semi-statically configuring the PUCCH repetition factor (for example, using an RRC message or upon switching a PUCCH format) may result in a period of time elapsing to alter the PUCCH repetition factor during operation. For example, alteration of the PUCCH repetition factor may be delayed based at least in part on a dynamic queuing delay associated with a scheduler of a base station 102, an availability of resources for an RRC message, or a processing time before the configuration in an RRC message takes effect, among other examples. As a result, the PUCCH repetition factor may not be optimized for current channel conditions (for example, due to the delay described above). Therefore, in some cases, a PUCCH repetition factor may be dynamically indicated to a UE 104. For example, a PUCCH repetition factor may be dynamically indicated using DCI, such as DCI associated with indicating a PUCCH resource configuration or DCI scheduling another downlink communication. In some cases, a PUCCH resource set configuration may indicate a PUCCH repetition factor or a validity period (for example, an amount of time that an indication is valid for) associated with dynamic PUCCH repetition factor indications. In this way, the UE 104 may reduce an amount of time, or a usage of network resources, among other examples, associated with configuring a PUCCH repetition factor, thereby improving network performance and enhancing coverage for the UE 104.

For example, a base station 102 may transmit, and a UE 104 may receive, a downlink message 910 (for example, a DCI message) indicating a repetition factor for a PUCCH message (for example, a PUCCH repetition factor). For example, a DCI message may dynamically indicate a PUCCH repetition factor for a configured PUCCH resource set. The PUCCH resource set may be associated with a downlink message 920. In some cases, the PUCCH resource set may be used by the UE 104 to transmit ACK or NACK feedback to the base station 102 associated with the downlink message 920. In some examples, the downlink message 920 may be a downlink message scheduled by the DCI (for example, a physical downlink shared channel (PDSCH) message scheduled by the DCI that carries the PUCCH repetition factor). In some other examples, the downlink message 920 may be another downlink message, such as a semi-persistent scheduling (SPS) downlink message. For example, the DCI may schedule a downlink message (not shown in FIG. 9) and may indicate a PUCCH repetition factor for a PUCCH resource set associated with the downlink message 920.

The UE 104 may transmit a PUCCH message 930 (for example, an initial repetition of the PUCCH message) associated with the downlink message 920. For example, the UE 104 may attempt to receive or decode the downlink message 920 and may transmit ACK or NACK feedback in the PUCCH message 930 based at least in part on whether the UE 104 was able to successfully receive or decode the downlink message 920.

In some cases, SPS may be used to schedule a set of downlink messages for the UE 104 without individual downlink grants (for example, in DCI) for each downlink message, thereby conserving signaling overhead. For example, each downlink message may correspond to an SPS occasion of a set of SPS occasions. An SPS occasion may be a set of resources (for example, time resources and frequency resources) to be used by the base station 102 to transmit a downlink message. In some cases, a base station 102 may transmit (for example, via RRC signaling) information to the UE 104 that identifies one or more parameters for an SPS configuration. The one or more parameters may include a periodicity for SPS occasions, a quantity of hybrid automatic repeat request (HARD) processes associated with the SPS configuration, or a PUCCH resource set or configuration associated with the SPS configuration, among other examples.

SPS downlink messages (for example, SPS PDSCH messages) in accordance with the SPS configuration may be activated by DCI. The DCI also may indicate one or more transmission parameters for the activated SPS configuration. The one or more transmission parameters may include a resource allocation (for example, time or frequency resources) that is to be used for each SPS occasion (for example, each SPS PDSCH message), a modulation and coding scheme (MCS), a transport block (TB) size, or one or more transmission configuration indication (TCI) states, among other examples. After receiving the activation DCI, the UE 104 may begin monitoring for SPS messages scheduled in accordance with the SPS configuration. In other words, after an SPS configuration is activated, the UE 104 may receive SPS downlink messages based at least in part on a periodicity associated with the SPS configuration. The UE may continue to monitor for SPS messages or receive SPS messages, in accordance with the SPS configuration, until another DCI releases (for example, deactivates) the SPS configuration.

For example, an SPS configuration may configure the UE 104 to monitor an SPS occasion 940. The SPS configuration may indicate that the UE 104 is to use a PUCCH resource 950 associated with the SPS occasion 940 for transmitting uplink control information associated with the SPS occasion 940 (for example, ACK or NACK feedback). As described above, the PUCCH resource may be configured or indicated by the SPS configuration associated with the SPS occasion 940.

The UE 104 may be configured to transmit a repetition of the PUCCH message 930 using a PUCCH resource 960. For example, in accordance with the PUCCH repetition factor indicated in the downlink message, the UE 104 may be scheduled to transmit a repetition of the PUCCH message using the PUCCH resource 960 as shown in FIG. 9. However, in some cases, the PUCCH resource 960 associated with the repetition of the PUCCH message may cause a collision 970 with another PUCCH resource (for example, PUCCH resource 950). As used herein, "collision" may refer to time domain resources for a first resource set (for example, a first PUCCH resource set) at least partially overlapping with time domain resources for a second resource set (for example, a second PUCCH resource set).

For example, as shown in FIG. 9, the PUCCH resource 960 for the repetition of the PUCCH message may collide with the PUCCH resource 950 associated with the SPS occasion 940. For example, when the SPS occasion 940 is configured, the repetitions of the PUCCH message 930 may not be configured or scheduled. For example, the UE 104 may not be scheduled or configured to transmit a PUCCH message using a PUCCH resource, such as the PUCCH resource 960, that would collide with the PUCCH resource 950 (for example, as the UE 104 may not be configured to repeat the PUCCH message 930 associated with the downlink message 920). Therefore, a base station 102 may configure the UE 104 to use the PUCCH resource 950 associated with the SPS occasion 940 as there are no other configured PUCCH messages that may potentially cause a collision with the PUCCH resource 950. However, when the PUCCH repetition factor for the PUCCH message 930 associated with the downlink message 920 is dynamically indicated (for example, after the SPS occasion 940 is configured), a collision may occur between a PUCCH resource for a repetition of the PUCCH message and a PUCCH resource for the configured SPS occasion, as shown in FIG. 9. As the SPS configuration is semi-statically configured, the UE 104 may be unable to adjust a timing or an allocation of the resources associated with the SPS configuration. The collision may negatively impact communication performance for the UE 104 as the UE 104 may be unable to transmit both PUCCH messages at the same time. As a result, network performance and coverage for the UE 104 may be degraded based at least in part on the UE 104 failing to transmit one (or both) of the PUCCH messages (for example, due to the collision as described above).

Various aspects relate generally to collision handling for uplink control channel repetition (for example, PUCCH repetitions) caused by dynamic indication of a PUCCH repetition factor. Some aspects more specifically relate to enabling a UE 104 to transmit one PUCCH message associated with the collision and drop (for example, not transmit) the other PUCCH message associated with the collision based at least in part on a priority of downlink messages associated with the PUCCH messages. In some aspects, based at least in part on a PUCCH repetition associated with a dynamically indicated PUCCH repetition factor colliding with a PUCCH resource associated with an SPS occasion, the UE 104 may be enabled to not monitor resources of the SPS occasion and not transmit on the PUCCH resource associated with the SPS occasion. For example, a base station 102 may not transmit a downlink message during the SPS occasion, and the UE 104 may not monitor for signals during the SPS occasion. Therefore, the UE 104 may be enabled to transmit the PUCCH repetition associated with the dynamically indicated PUCCH repetition factor based at least in part on not monitoring the SPS occasion.

In some other aspects, based on the SPS occasion being associated with a higher priority than a downlink message associated with the PUCCH repetition, the UE 104 may drop (for example, not transmit) the PUCCH repetition and may monitor the SPS occasion (and transmit uplink control information using the PUCCH resource associated with the SPS occasion). In some aspects, the dynamic indication of the PUCCH repetition factor may implicitly raise or elevate a priority associated with the PUCCH repetition (for example, when the downlink message associated with the PUCCH repetition and the SPS occasion have the same priority level).

Particular aspects of the subject matter described in this disclosure can be implemented to realize one or more of the following potential advantages. In some examples, the described techniques can be used to enable the UE 104 to handle collisions of PUCCH resources caused by a dynamic indication of a PUCCH repetition factor. In some examples, the described techniques can be used to enable the UE 104 to avoid PUCCH resource collisions, which may improve network performance and enhance coverage for the UE, by identifying which PUCCH resource (for example, from two colliding PUCCH resources) to use to transmit a corresponding PUCCH message (such as a repetition associated with a dynamically-indicated repetition factor or a message associated with an SPS occasion). For example, the described techniques can be used to ensure a PUCCH message associated with a first downlink message with a higher priority is transmitted, and a PUCCH message associated with a second downlink message with a lower priority (for example, a lower priority than the priority of the first downlink message) is dropped (for example, not transmitted) by the UE 104.

Figure 10:
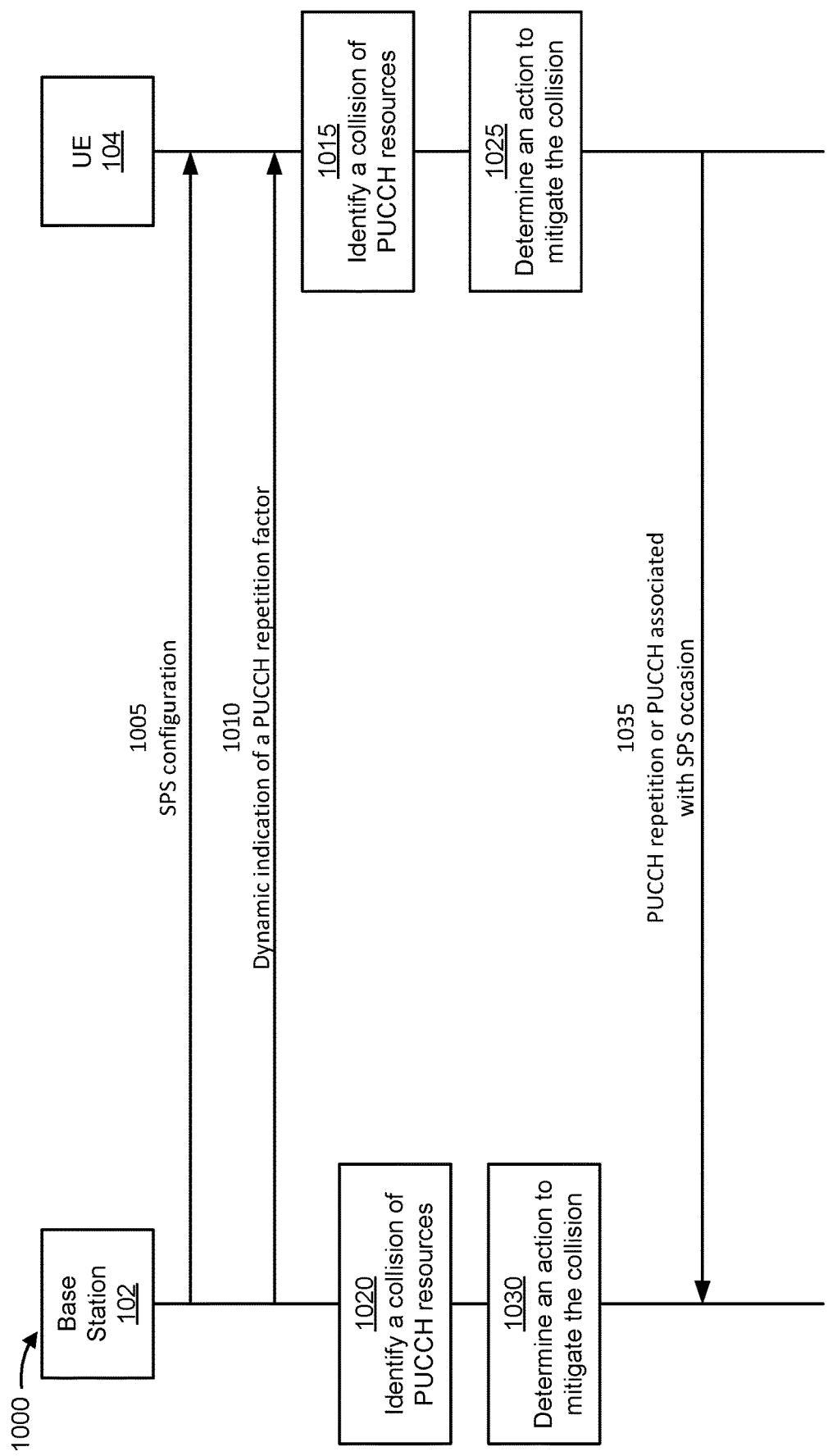
FIG. 10 is a diagram illustrating an example of collision handling for uplink control channel repetitions, in accordance with the present disclosure.

FIG. 10 is a diagram illustrating an example of collision handling 1000 for uplink control channel repetitions, in accordance with the present disclosure. As shown in FIG. 10, a base station 102 and a UE 104 may communicate with each other. In some aspects, the base station 102 and the UE 104 may be included in a wireless network, such as wireless network 100. The base station 102 and the UE 104 may communicate via a wireless access link, which may include an uplink and a downlink.

In a first operation 1005, the base station 102 may transmit, and the UE 104 may receive, an SPS configuration. In some aspects, the base station 102 may transmit (for example, via RRC signaling) information to the UE 104 that identifies one or more parameters for the SPS configuration. The one or more parameters may include a periodicity for SPS occasions, a quantity of HARQ processes associated with the SPS configuration, or a PUCCH resource set or configuration associated with the SPS configuration, among other examples.

In some aspects, the base station 102 may transmit, and the UE 104 may receive, an activation message (for example, via DCI signaling or medium access control (MAC) control element (MAC-CE) signaling) to activate the SPS configuration. For example, the activation message may indicate one or more transmission parameters for the SPS configuration. The one or more transmission parameters may include a resource allocation (for example, time and frequency resources) that is to be used for each SPS occasion (for example, each SPS PDSCH message), an MCS, a TB size, or one or more TCI states, among other examples. In some aspects, the activation message may indicate a PUCCH resource set or configuration associated with the SPS configuration. For example, the activation message may indicate one or more PUCCH resources that the UE 104 is to use to transmit uplink control information associated with SPS downlink messages (for example, to transmit ACK or NACK feedback for SPS downlink messages associated with the SPS configuration). In some aspects, the UE 104 may receive an indication of a PUCCH resource associated with one or more SPS occasions. For example, the UE 104 may be configured to monitor for SPS downlink messages during an SPS occasion and transmit uplink control information (for example, ACK or NACK feedback) associated with the SPS occasion using the PUCCH resource corresponding to the SPS occasion. In some other aspects, the PUCCH resource set or configuration associated with the SPS configuration may be indicated in the SPS configuration (for example, rather than in the activation message).

In a second operation 1010, the base station 102 may transmit, and the UE 104 may receive, a dynamic indication of a PUCCH repetition factor. For example, the base station 102 may transmit, and the UE 104 may receive, a dynamic indication of one or more repetitions of a PUCCH message. In some aspects, the PUCCH repetition factor may indicate a quantity of repetitions of the PUCCH message to be transmitted by the UE 104. In some aspects, the base station 102 may transmit the dynamic indication of the PUCCH repetition factor using DCI signaling, among other examples. For example, the base station 102 may transmit DCI that schedules a downlink message (for example, a PDSCH message). The DCI may indicate a PUCCH repetition factor for a PUCCH message associated with the downlink message. In some other aspects, the DCI may schedule a PDSCH message and indicate a PUCCH repetition factor for a PUCCH resource associated with a configured SPS occasion. Therefore, the PUCCH repetitions configured by the dynamic indication of the PUCCH repetition factor may be associated with any downlink message (for example, a dynamically schedule PDSCH message or an SPS downlink message).

In a third operation 1015, the UE 104 may identify a collision of PUCCH resources caused by the dynamic indication of the PUCCH repetition factor. For example, as described above, a first PUCCH resource associated with an SPS occasion may be configured for the UE 104. In some aspects, the first PUCCH resource may be associated with a first PUCCH resource set. In some aspects, a second PUCCH resource associated with a repetition of the PUCCH message (for example, configured by the dynamic indication of the PUCCH repetition factor) may at least partially overlap in the time domain with the first PUCCH resource (for example, may collide the with first uplink control channel resource). For example, the second PUCCH resource may be associated with the first PUCCH resource set (for example, the same PUCCH resource set as the first PUCCH resource). In some other examples, the second PUCCH resource may be associated with a second PUCCH resource set that at least partially overlap in the time domain with the first PUCCH resource set. Therefore, the UE 104 may be unable to transmit uplink control information for the SPS occasion (for example, using the first PUCCH resource) and the repetition of the PUCCH message (for example, using the second PUCCH resource) based at least in part on the collision. The UE 104 may identify the collision of the PUCCH resources based at least in part on the SPS configuration, the activation message associated with the SPS configuration, or the dynamic indication of the PUCCH repetition factor, among other examples. In a fourth operation 1020, the base station 102 may identify the collision of PUCCH resources caused by the dynamic indication of the PUCCH repetition factor. For example, the base station 102 may identify the collision of the PUCCH resources in a similar manner as described above.

In a fifth operation 1025, the UE 104 may determine an action to perform to mitigate the collision of the PUCCH resources. For example, the UE 104 may determine that only one of the repetitions of the PUCCH message (for example, configured by the dynamic indication of the PUCCH repetition factor) or uplink control information on the first PUCCH resource (for example, a PUCCH message associated with the SPS occasion) is to be transmitted. In other words, the UE 104 may determine to drop (for example, not transmit) one of the repetition of the PUCCH message (the repetition associated with the collision) or the PUCCH message associated with the SPS occasion. In a sixth operation 1030, the base station 102 may determine the action to perform to mitigate the collision of the PUCCH resources. For example, the base station 102 may determine the action to perform to mitigate the collision of the PUCCH resources in a similar manner as described herein in connection with the UE 104.

As used herein, "drop" or "dropping" of the PUCCH message associated with the SPS occasion may include refraining from transmitting uplink control information using the PUCCH resources associated with the SPS occasion. Additionally or alternatively, "drop" or "dropping" of the PUCCH message associated with the SPS occasion may include refraining from monitoring for communications during the SPS occasion. For example, if the action to perform to mitigate the collision of the PUCCH resources includes dropping the PUCCH message associated with the SPS occasion, then the base station 102 may refrain from (may not) transmit an SPS downlink message during the SPS occasion, and the UE 104 may refrain from (may not) monitor for communications during the SPS occasion. For example, in some aspects, when a collision caused by the dynamic indication of the PUCCH repetition factor occurs (as described elsewhere herein), the UE 104 may not be expected to monitor the SPS occasion associated with the collision. This may conserve resources that would have otherwise been used to transmit a downlink message during the SPS occasion (for example, by the base station 102) and to monitor for the downlink message during the SPS occasion (for example, by the UE 104) when the PUCCH message associated with the SPS occasion will not be transmitted by the UE 104 (for example, due to the collision caused by the dynamic indication of the PUCCH repetition factor). Therefore, as used herein, drop" or "dropping" of the PUCCH message associated with the SPS occasion may refer to refraining for monitoring an SPS occasion (by the UE 104), refraining from transmitting an SPS downlink message during the SPS occasion (by the base station 102), or refraining from transmitting uplink control information using the PUCCH resource associated with the SPS occasion (by the UE 104).

In some aspects, the UE 104 may determine whether to transmit the repetition of the PUCCH message or the PUCCH message associated with the SPS occasion based at least in part on a first priority of the downlink message associated with the repetition and a second priority of the SPS occasion. For example, if the downlink message has a higher priority than the SPS occasion, then the UE 104 may transmit the repetition of the PUCCH message (for example, and drop or not transmit the PUCCH message associated with the SPS occasion). Alternatively, if the SPS occasion has a higher priority than the downlink message, then the UE 104 may transmit the PUCCH message associated with the SPS occasion (for example, and drop or not transmit the repetition of the PUCCH message associated with the downlink message).

In some aspects, a priority level may be based at least in part on a type of traffic associated with the downlink message and the SPS occasion. For example, URLLC traffic may have a higher priority than enhanced mobile broadband (eMBB) traffic. In some aspects, the priority level for an SPS occasion may be indicated by the SPS configuration. In some aspects, the priority level for a downlink message may be indicated by a message scheduling the downlink message (for example, a DCI message). In some aspects, the UE 104 may implicitly determine a priority level of a downlink message or SPS occasion based at least in part on a traffic type. For example, an RRC configuration or another configuration may indicate priority levels associated with different traffic types. The UE 104 may identify a priority level of a downlink message or SPS occasion based at least in part on a traffic type and the RRC configuration.

In some aspects, the dynamic indication of the PUCCH repetition factor may implicitly elevate or raise a priority level of the downlink message associated with the PUCCH message. For example, if the base station 102 transmits the dynamic indication of the PUCCH repetition factor for a PUCCH message associated with a downlink message, the UE 104 may determine or identify that a priority associated with the downlink message has been elevated or raised. For example, the dynamic indication of the PUCCH repetition factor may indicate that successful communication of the PUCCH message is important for coverage enhancement of the UE 104 as the base station 102 has configured the UE 104 to repeat the PUCCH message to ensure successful communication. Therefore, if the downlink message (for example associated with the repetition of the PUCCH message) and the SPS occasion are associated with the same priority level, the dynamic indication of the PUCCH repetition factor may indicate that the downlink message has a higher priority than the SPS occasion. As a result, the UE 104 may transmit the repetition of the PUCCH message (for example, and drop or not transmit the PUCCH message associated with the SPS occasion).

In some aspects, one or more rules may indicate the action to perform to mitigate the collision of the PUCCH resources. For example, one or more rules may indicate whether the UE 104 is to transmit the repetition of the PUCCH message (for example, using the second PUCCH resource described above) or transmit a PUCCH message associated with the SPS occasion (for example, using the first PUCCH resource described above) when a dynamic indication of a PUCCH repetition factor causes a collision as described above. For example, the one or more rules may indicate the priority levels associated with the repetition of the PUCCH message and the SPS occasion. In some aspects, the one or more rules may be defined, or otherwise fixed, by a wireless communication standard (for example, the 3GPP). In some aspects, the one or more rules may be included in, or indicated by, the SPS configuration associated with the SPS occasion. In some other aspects, the one or more rules may be included in, or indicated by, a configuration of PUCCH resource sets (for example, an RRC configuration).

In some aspects, the UE 104 may determine whether to transmit the repetition of the PUCCH message or the PUCCH message associated with the SPS occasion based at least in part on the first PUCCH resource set (for example, associated with the PUCCH message and the SPS occasion) and the second PUCCH resource set (for example, associated with the repetition of the PUCCH message). For example, the UE 104 may determine whether to transmit the repetition of the PUCCH message or the PUCCH message associated with the SPS occasion based at least in part on a first priority of the first PUCCH resource set and a second priority of the second PUCCH resource set (for example, in a similar manner as described in in connection with the priority levels of the downlink messages associated with the PUCCH messages). For example, whether to transmit the repetition of the PUCCH message or the PUCCH message associated with the SPS occasion due to a collision caused by the dynamic indication of the PUCCH repetition factor may be indicated by a configuration of the PUCCH resource sets. In some aspects, the configuration of the PUCCH resource sets may indicate that the UE 104 is to transmit the repetition of the PUCCH message and drop (for example, not transmit) the PUCCH message associated with the SPS occasion when there is a collision caused by the dynamic indication of the PUCCH repetition factor. In some other aspects, the configuration of the PUCCH resource sets may indicate that the UE 104 is to transmit the PUCCH message associated with the SPS occasion and drop (for example, not transmit) the repetition of the PUCCH message when there is a collision caused by the dynamic indication of the PUCCH repetition factor.

In some aspects, a collision of PUCCH resources caused by the dynamic indication of the PUCCH repetition factor may not be limited to a single instance. For example, the dynamic indication of the PUCCH repetition factor may indicate that the UE 104 is to transmit multiple repetitions of the PUCCH message over time. Similarly, the SPS configuration may indicate that SPS occasions are to occur periodically (for example, in accordance with a set periodicity), and PUCCH resources associated with the SPS occasion may be located a similar (or same) amount of time after each SPS occasion. Therefore, collisions of PUCCH resources associated with the repetitions and the SPS occasions may occur multiple times (for example, may persist over time). Therefore, in some aspects, the UE 104 may not monitor multiple SPS occasions and may drop (for example, not transmit using) multiple PUCCH resources associated with the multiple SPS occasions in order to mitigate the persistent collisions caused by the dynamic indication of the PUCCH repetition factor. In some aspects, the quantity of the multiple SPS occasions may be based at least in part on a validity period associated with the dynamic indication of the PUCCH repetition factor. For example, the validity period may indicate an amount of time with which the dynamic indication of the PUCCH repetition factor is associated. For example, the validity period may be indicated by a configuration of a PUCCH resource set that is to be repeated or by the dynamic indication of the PUCCH repetition factor. The UE 104 may not monitor SPS occasions and may drop (for example, not transmit using) PUCCH resources associated with the SPS occasions that occur during the validity period associated with the dynamic indication of the PUCCH repetition factor. In this way, the UE 104 may ensure that multiple collisions caused by the dynamic indication of the PUCCH repetition factor are mitigated.

In a seventh operation 1035, the UE 104 may transmit only one of uplink control information associated with the repetition of the PUCCH message (for example, configured by the dynamic indication of the PUCCH repetition factor) or uplink control information associated with the SPS occasion using a PUCCH resource associated with the SPS occasion. For example, in some aspects, the UE 104 may transmit the uplink control information associated with the repetition of the PUCCH message using the second PUCCH resource (for example, that is involved in the collision, as described above). The UE 104 may refrain from monitoring the SPS occasion. The base station 102 may refrain from transmitting an SPS downlink message during the SPS occasion. Additionally or alternatively, the UE 104 may refrain from transmitting using the second PUCCH resource associated with the SPS occasion (for example, that is involved in the collision, as described above).

Alternatively, in the seventh operation 1035, the UE 104 may transmit the uplink control information associated with the SPS occasion using the first PUCCH resource (for example, that is involved in the collision, as described above). For example, the base station 102 may transmit an SPS downlink message during the SPS occasion. The UE 104 may monitor for and attempt to decode or receive the SPS downlink message. The UE 104 may transmit uplink control information (for example, ACK or NACK feedback) associated with the SPS downlink message using the first PUCCH resource (for example, that is involved in the collision, as described above). Additionally, the UE 104 may refrain from transmitting uplink control information associated with the repetition of the PUCCH message (for example, configured by the dynamic indication of the PUCCH repetition factor).

Although the examples above have been described in connection with a resources of a repetition of a PUCCH message colliding with resources of a PUCCH message associated with an SPS occasion, similar techniques and operations may be applied when resources of a repetition of a PUCCH message collide with resources of a PUCCH message associated with another type of downlink message (for example, a dynamically scheduled PDSCH message). For example, the base station 102 may schedule a PDSCH message and a corresponding PUCCH message. The base station 102 may transmit the dynamic indication of a PUCCH repetition factor (for example, in a similar manner as described above) that causes a collision of PUCCH resources with the PUCCH message associated with the scheduled PDSCH message. The UE 104 and the base station 102 may perform an action to mitigate the collision in a similar manner as described above.

As a result, the UE 104 and the base station 102 may be enabled to handle collisions of PUCCH resources caused by the dynamic indication of a PUCCH repetition factor. For example, the UE 104 may be enabled to identify which PUCCH resource (for example, from two colliding PUCCH resource) to use to transmit a PUCCH message. For example, the described techniques can be used to ensure a PUCCH message associated with a first downlink message with a higher priority is transmitted, and a PUCCH message associated with a second downlink message with a lower priority (for example, a lower priority than the priority of the first downlink message) is dropped (for example, not transmitted) by the UE 104. In some examples, the described techniques can be used to improve network performance and enhance coverage for the UE 104 by enabling the UE 104 to handle collisions caused by a dynamic indication of a PUCCH repetition factor.

Figure 11:
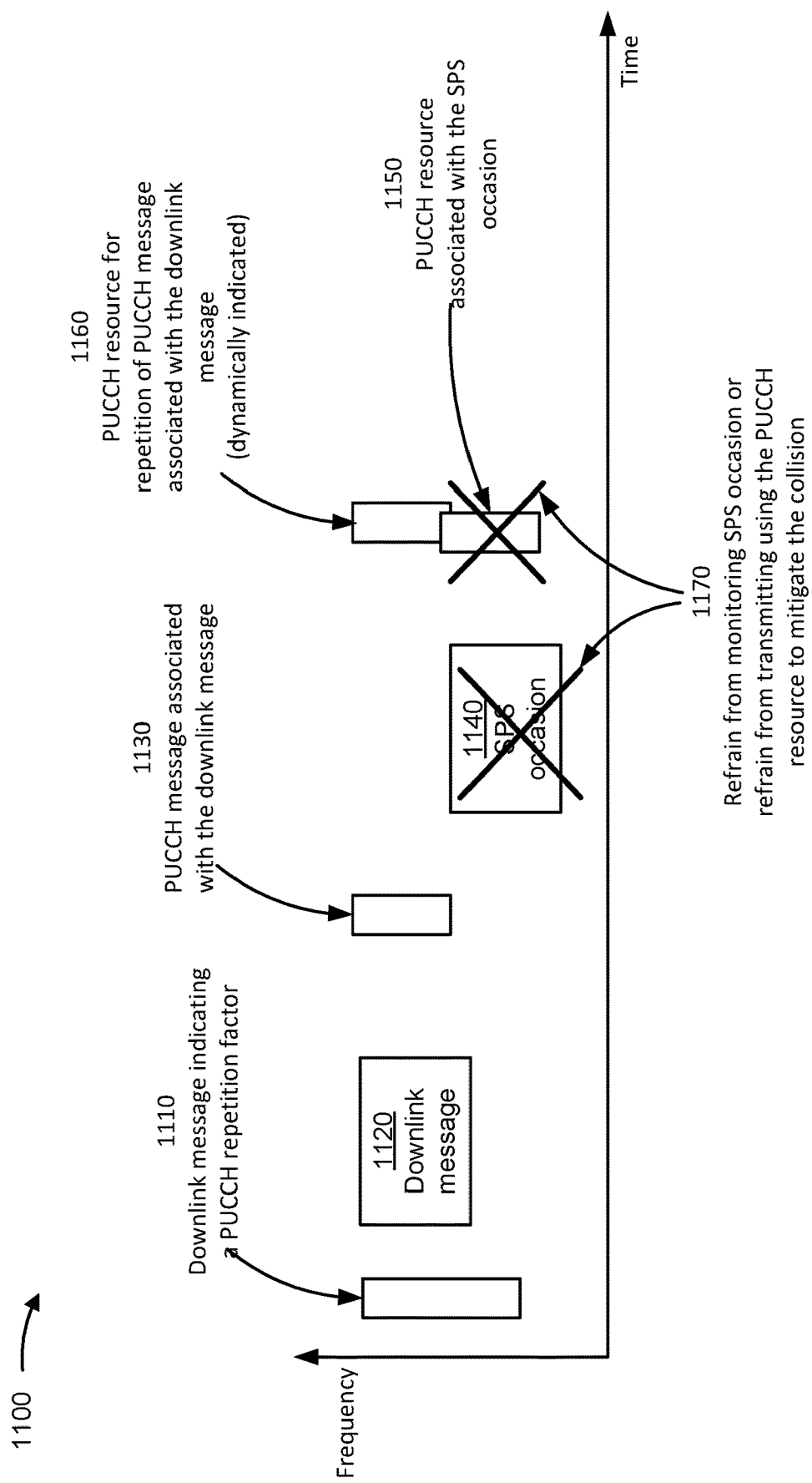
FIG. 11 is a diagram illustrating an example timeline associated with handling collisions of PUCCH resources caused by a dynamic indication of a PUCCH repetition factor, in accordance with the present disclosure.

FIG. 11 is a diagram illustrating an example timeline 1100 associated with handling collisions of PUCCH resources caused by a dynamic indication of a PUCCH repetition factor, in accordance with the present disclosure. As shown in FIG. 11, a UE 104 may receive a downlink message 1110 that may dynamically indicate a PUCCH repetition factor (for example, in a similar manner as described elsewhere herein). The PUCCH repetition factor may indicate or configure one or more repetitions of a PUCCH message 1130 associated with a downlink message 1120. For example, the PUCCH message 1130 may be used by a UE 104 to transmit uplink control information (for example, ACK or NACK feedback) associated with the downlink message 1120.

In some aspects, the UE 104 may be configured with an SPS occasion 1140 (for example, by an SPS configuration in a similar manner as described elsewhere herein). The SPS occasion 1140 may be associated with a PUCCH resource 1150. The PUCCH resource 1150 may be used by the UE 104 to transmit uplink control information (for example, ACK or NACK feedback) associated with the SPS occasion 1140. For example, the UE 104 may be configured to monitor the SPS occasion 1140 for SPS downlink messages and may transmit ACK or NACK feedback using the PUCCH resource 1150 (for example, based at least in part on whether the UE 104 was able to successfully receive or decode a downlink message during the SPS occasion 1140).

As shown in FIG. 11, a PUCCH resource 1160 may be associated with a repetition of the PUCCH message 1130. For example, the dynamic indication of the PUCCH repetition factor may indicate that the UE 104 is to use the PUCCH resource 1160 to transmit a repetition of the PUCCH message 1130. However, as shown in FIG. 11, the PUCCH resource 1160 may at least partially overlap in the time domain with the PUCCH resource 1150 (for example, the PUCCH resource 1160 may collide with the PUCCH resource 1150). As a result, the UE 104 may be unable to transmit using one (or both) of the PUCCH resource 1150 or the PUCCH resource 1160 because of the collision. As described above, the collision may be caused by the dynamic indication of the PUCCH repetition factor as the PUCCH resource 1160 may not be configured or scheduled with the repetition when the SPS occasion 1140 is configured. Therefore, dynamically indicating the UE 104 to use the PUCCH resource 1160 to transmit the repetition of the PUCCH message 1130 may cause an unexpected collision of PUCCH resources.

In a first operation 1170, the UE 104 may refrain from monitoring the SPS occasion 1140 or refrain from transmitting using the PUCCH resource 1150 to mitigate the collision. For example, to mitigate the collision of the PUCCH resource 1150 and the PUCCH resource 1160, the UE 104 may not be expected to monitor the SPS occasion 1140. As a result, the UE 104 may not have any uplink control information to transmit on the PUCCH resource 1150 (for example, as no monitoring of the SPS occasion 1140 is performed). Therefore, the UE 104 may be enabled to transmit the repetition of the PUCCH message 1130 using the PUCCH resource 1160 as the PUCCH resource 1150 is no longer needed by the UE 104. As described above, the UE 104 may refrain from monitoring the SPS occasion 1140 or refrain from transmitting using the PUCCH resource 1150 to mitigate the collision when the downlink message 1120 has a higher priority than the SPS occasion 1140.

Alternatively, in the first operation 1170, the UE 104 may refrain from transmitting the repetition of the PUCCH message 1130 using the PUCCH resource 1160 to mitigate the collision (not shown in FIG. 11). For example, if the SPS occasion 1140 has a higher priority than the downlink message 1120, then the UE 104 may refrain from transmitting the repetition of the PUCCH message 1130 and may monitor the SPS occasion 1140 for SPS downlink messages. As a result, the UE 104 may be enabled to transmit uplink control information associated with the SPS occasion 1140 using the PUCCH resource 1150 because the UE 104 is refraining from transmitting the repetition of the PUCCH message 1130 using the PUCCH resource 1160.

Figure 12:
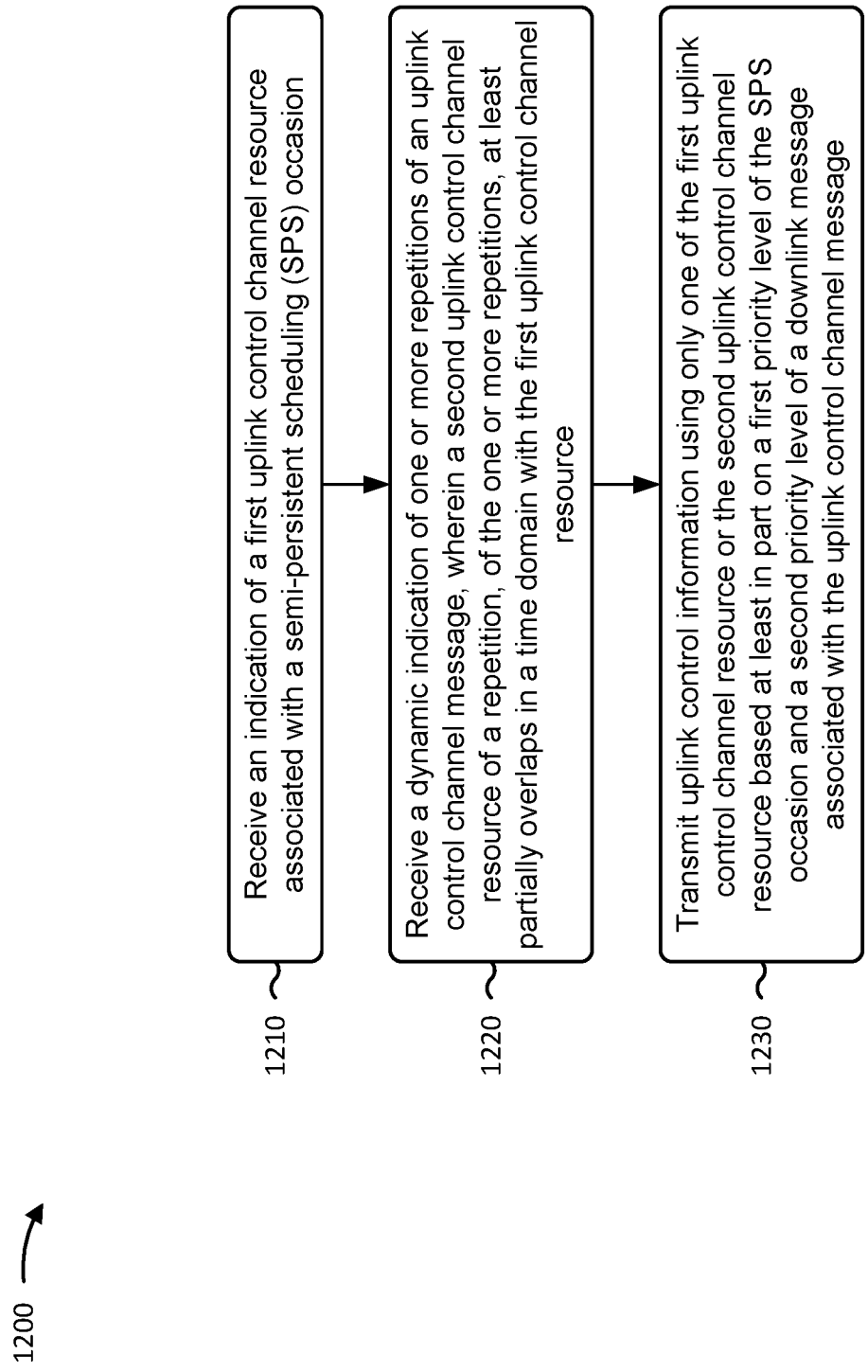
FIG. 12 is a flowchart illustrating an example process performed, for example, by a UE that supports collision handling for uplink control channel repetitions, in accordance with the present disclosure.

FIG. 12 is a flowchart illustrating an example process 1200 performed, for example, by a UE to support collision handling for uplink control channel repetitions, in accordance with the present disclosure. Example process 1200 is an example where the UE (for example, UE 104) performs operations associated with collision handling for uplink control channel repetitions.

As shown in FIG. 12, in some aspects, process 1200 may include receiving an indication of a first uplink control channel resource associated with an SPS occasion (block 1210). For example, the UE may receive an indication of a first uplink control channel resource associated with an SPS occasion, as described above.

As further shown in FIG. 12, in some aspects, process 1200 may include receiving a dynamic indication of one or more repetitions of an uplink control channel message, wherein a second uplink control channel resource of a repetition, of the one or more repetitions, at least partially overlaps in a time domain with the first uplink control channel resource (block 1220). For example, the UE may receive a dynamic indication of one or more repetitions of an uplink control channel message, wherein a second uplink control channel resource of a repetition, of the one or more repetitions, at least partially overlaps in a time domain with the first uplink control channel resource, as described above.

As further shown in FIG. 12, in some aspects, process 1200 may include transmitting uplink control information using only one of the first uplink control channel resource or the second uplink control channel resource based at least in part on a first priority level of the SPS occasion and a second priority level of a downlink message associated with the uplink control channel message (block 1230). For example, the UE may transmit uplink control information using only one of the first uplink control channel resource or the second uplink control channel resource based at least in part on a first priority level of the SPS occasion and a second priority level of a downlink message associated with the uplink control channel message, as described above.

Process 1200 may include additional aspects, such as any single aspect or any combination of aspects described below or in connection with one or more other processes described elsewhere herein.

In a first additional aspect, transmitting the uplink control information includes transmitting the repetition of the uplink control channel message using the second uplink control channel resource based at least in part on the first priority level and the second priority level, and refraining from monitoring for communications during the SPS occasion based at least in part on the second uplink control channel resource at least partially overlapping in the time domain with the first uplink control channel resource.

In a second additional aspect, alone or in combination with the first aspect, transmitting the uplink control information includes transmitting the repetition of the uplink control channel message using the second uplink control channel resource based at least in part on the second priority level having a higher priority than the first priority level.

In a third additional aspect, alone or in combination with one or more of the first and second aspects, receiving the dynamic indication of the one or more repetitions of the uplink control channel message indicates an elevated priority level associated with the second priority level.

In a fourth additional aspect, alone or in combination with one or more of the first through third aspects, transmitting the uplink control information includes transmitting uplink control information associated with the SPS occasion using the first uplink control channel resource based at least in part on the first priority level having a higher priority than the second priority level.

In a fifth additional aspect, alone or in combination with one or more of the first through fourth aspects, one or more rules indicate whether to transmit using the first uplink control channel resource or the second uplink control channel resource based at least in part on the first priority level and the second priority level.

In a sixth additional aspect, alone or in combination with one or more of the first through fifth aspects, receiving the indication of the first uplink control channel resource includes receiving an SPS configuration that includes the indication of the first uplink control channel resource associated with the SPS occasion, the SPS configuration indicating the one or more rules.

In a seventh additional aspect, alone or in combination with one or more of the first through sixth aspects, process 1200 includes receiving a configuration for uplink control channel resource sets, the configuration indicating the one or more rules.

In an eighth additional aspect, alone or in combination with one or more of the first through seventh aspects, the first uplink control channel resource is associated with a first uplink control channel resource set and the second uplink control channel resource is associated with a second uplink control channel resource set, and transmitting the uplink control information includes transmitting the uplink control information using only one of the first uplink control channel resource or the second uplink control channel resource based at least in part on the first uplink control channel resource set and the second uplink control channel resource set.

In a ninth additional aspect, alone or in combination with one or more of the first through eighth aspects, the first uplink control channel resource set and the second uplink control channel resource set are a same uplink control channel resource set.

In a tenth additional aspect, alone or in combination with one or more of the first through ninth aspects, a first time domain resource allocation associated with the first uplink control channel resource set at least partially overlaps with a second time domain resource allocation associated with the second uplink control channel resource set.

In an eleventh additional aspect, alone or in combination with one or more of the first through tenth aspects, transmitting the uplink control information includes transmitting the uplink control information using only one of the first uplink control channel resource or the second uplink control channel resource based at least in part on a first priority level associated with the first uplink control channel resource set and a second priority level associated with the second uplink control channel resource set.

In a twelfth additional aspect, alone or in combination with one or more of the first through eleventh aspects, transmitting the uplink control information includes transmitting the repetition of the uplink control channel message using the second uplink control channel resource based at least in part on the first priority level and the second priority level, and refraining from monitoring for communications during a set of SPS occasions that includes the SPS occasion based at least in part on the second uplink control channel resource at least partially overlapping in the time domain with the first uplink control channel resource.

In a thirteenth additional aspect, alone or in combination with one or more of the first through twelfth aspects, refraining from monitoring for communications during the set of SPS occasions includes refraining from monitoring for communications during SPS occasions included in the set of SPS occasions for an amount of time, where the amount of time is based at least in part on a validity period associated with the dynamic indication of the one or more repetitions of the uplink control channel message.

In a fourteenth additional aspect, alone or in combination with one or more of the first through thirteenth aspects, the uplink control channel message is associated with a downlink shared channel message.

In a fifteenth additional aspect, alone or in combination with one or more of the first through fourteenth aspects, the uplink control channel message is associated with another SPS occasion.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
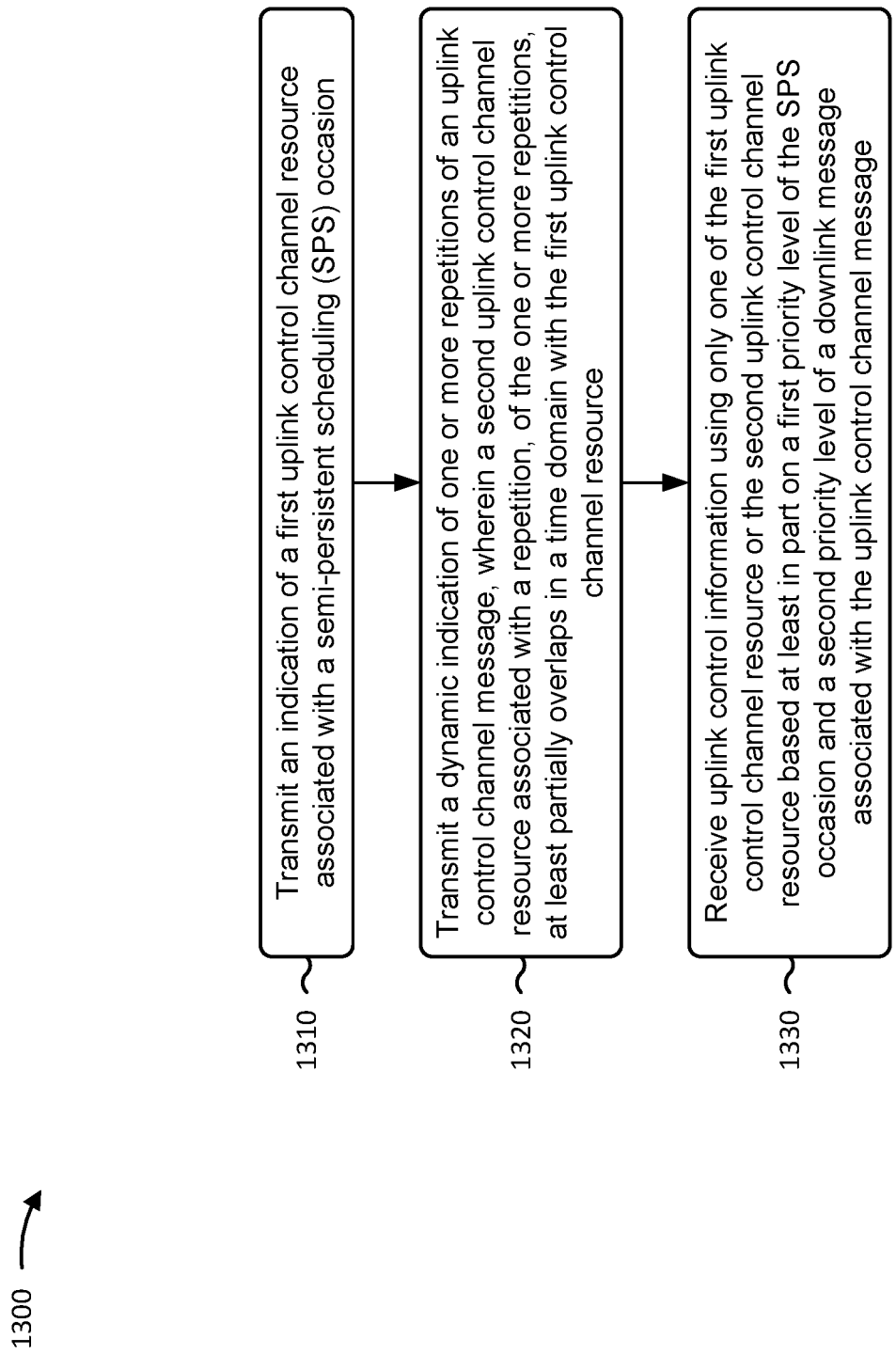
FIG. 13 is a flowchart illustrating an example process performed, for example, by a base station that supports collision handling for uplink control channel repetitions, in accordance with the present disclosure.

FIG. 13 is a flowchart illustrating an example process 1300 performed, for example, by a base station to support collision handling for uplink control channel repetitions, in accordance with the present disclosure. Example process 1300 is an example where the base station (for example, base station 102) performs operations associated with collision handling for uplink control channel repetitions.

As shown in FIG. 13, in some aspects, process 1300 may include transmitting an indication of a first uplink control channel resource associated with an SPS occasion (block 1310). For example, the base station may transmit an indication of a first uplink control channel resource associated with an SPS occasion, as described above.

As further shown in FIG. 13, in some aspects, process 1300 may include transmitting a dynamic indication of one or more repetitions of an uplink control channel message, wherein a second uplink control channel resource associated with a repetition, of the one or more repetitions, at least partially overlaps in a time domain with the first uplink control channel resource (block 1320). For example, the base station may transmit a dynamic indication of one or more repetitions of an uplink control channel message, wherein a second uplink control channel resource associated with a repetition, of the one or more repetitions, at least partially overlaps in a time domain with the first uplink control channel resource, as described above.

As further shown in FIG. 13, in some aspects, process 1300 may include receiving uplink control information using only one of the first uplink control channel resource or the second uplink control channel resource based at least in part on a first priority level of the SPS occasion and a second priority level of a downlink message associated with the uplink control channel message (block 1330). For example, the base station may receive uplink control information using only one of the first uplink control channel resource or the second uplink control channel resource based at least in part on a first priority level of the SPS occasion and a second priority level of a downlink message associated with the uplink control channel message, as described above.

Process 1300 may include additional aspects, such as any single aspect or any combination of aspects described below or in connection with one or more other processes described elsewhere herein.

In a first additional aspect, receiving the uplink control information includes receiving the repetition of the uplink control channel message using the second uplink control channel resource based at least in part on the first priority level and the second priority level, and refraining from transmitting a downlink message during the SPS occasion based at least in part on the second uplink control channel resource at least partially overlapping in the time domain with the first uplink control channel resource.

In a second additional aspect, alone or in combination with the first aspect, receiving the uplink control information includes receiving the repetition of the uplink control channel message using the second uplink control channel resource based at least in part on the second priority level having a higher priority than the first priority level.

In a third additional aspect, alone or in combination with one or more of the first through second aspects, transmitting the dynamic indication of the one or more repetitions of the uplink control channel message indicates an elevated priority level associated with the second priority level.

In a fourth additional aspect, alone or in combination with one or more of the first through third aspects, receiving uplink control information includes receiving uplink control information associated with the SPS occasion using the first uplink control channel resource based at least in part on the first priority level having a higher priority than the second priority level.

In a fifth additional aspect, alone or in combination with one or more of the first through fourth aspects, one or more rules indicate whether the repetition or the uplink control information using the first uplink control channel resource is to be received based at least in part on the first priority level and the second priority level.

In a sixth additional aspect, alone or in combination with one or more of the first through fifth aspects, transmitting the indication of the first uplink control channel resource includes transmitting an SPS configuration that includes the indication of the first uplink control channel resource associated with the SPS occasion, the SPS configuration indicating the one or more rules.

In a seventh additional aspect, alone or in combination with one or more of the first through sixth aspects, process 1300 includes transmitting a configuration for uplink control channel resource sets, the configuration indicating the one or more rules.

In an eighth additional aspect, alone or in combination with one or more of the first through seventh aspects, the first uplink control channel resource is associated with a first uplink control channel resource set and the second uplink control channel resource is associated with a second uplink control channel resource set, and receiving the uplink control information includes receiving the uplink control information using only one of the first uplink control channel resource or the second uplink control channel resource based at least in part on the first uplink control channel resource set and the second uplink control channel resource set.

In a ninth additional aspect, alone or in combination with one or more of the first through eighth aspects, the first uplink control channel resource set and the second uplink control channel resource set are a same uplink control channel resource set.

In a tenth additional aspect, alone or in combination with one or more of the first through ninth aspects, a first time domain resource allocation associated with the first uplink control channel resource set at least partially overlaps with a second time domain resource allocation associated with the second uplink control channel resource set.

In an eleventh additional aspect, alone or in combination with one or more of the first through tenth aspects, receiving the uplink control information includes receiving the uplink control information using only one of the first uplink control channel resource or the second uplink control channel resource based at least in part on a first priority level associated with the first uplink control channel resource set and a second priority level associated with the second uplink control channel resource set.

In a twelfth additional aspect, alone or in combination with one or more of the first through eleventh aspects, receiving the uplink control information includes receiving the repetition of the uplink control channel message using the second uplink control channel resource based at least in part on the first priority level and the second priority level, and refraining from transmitting downlink messages during a set of SPS occasions that includes the SPS occasion based at least in part on the second uplink control channel resource at least partially overlapping in the time domain with the first uplink control channel resource.

In a thirteenth additional aspect, alone or in combination with one or more of the first through twelfth aspects, refraining from transmitting the downlink messages during the set of SPS occasions includes refraining from transmitting the downlink messages during SPS occasions included in the set of SPS occasions for an amount of time, wherein the amount of time is based at least in part on a validity period associated with the dynamic indication of the one or more repetitions of the uplink control channel message.

In a fourteenth additional aspect, alone or in combination with one or more of the first through thirteenth aspects, the uplink control channel message is associated with a downlink shared channel message.

In a fifteenth additional aspect, alone or in combination with one or more of the first through fourteenth aspects, the uplink control channel message is associated with another SPS occasion.

Although FIG. 13 shows example blocks of process 1300, in some aspects, process 1300 may include additional blocks, fewer blocks, different blocks, or differently arranged blocks than those depicted in FIG. 13. Additionally or alternatively, two or more of the blocks of process 1300 may be performed in parallel.

Example Wireless Communication Devices

Figure 14:
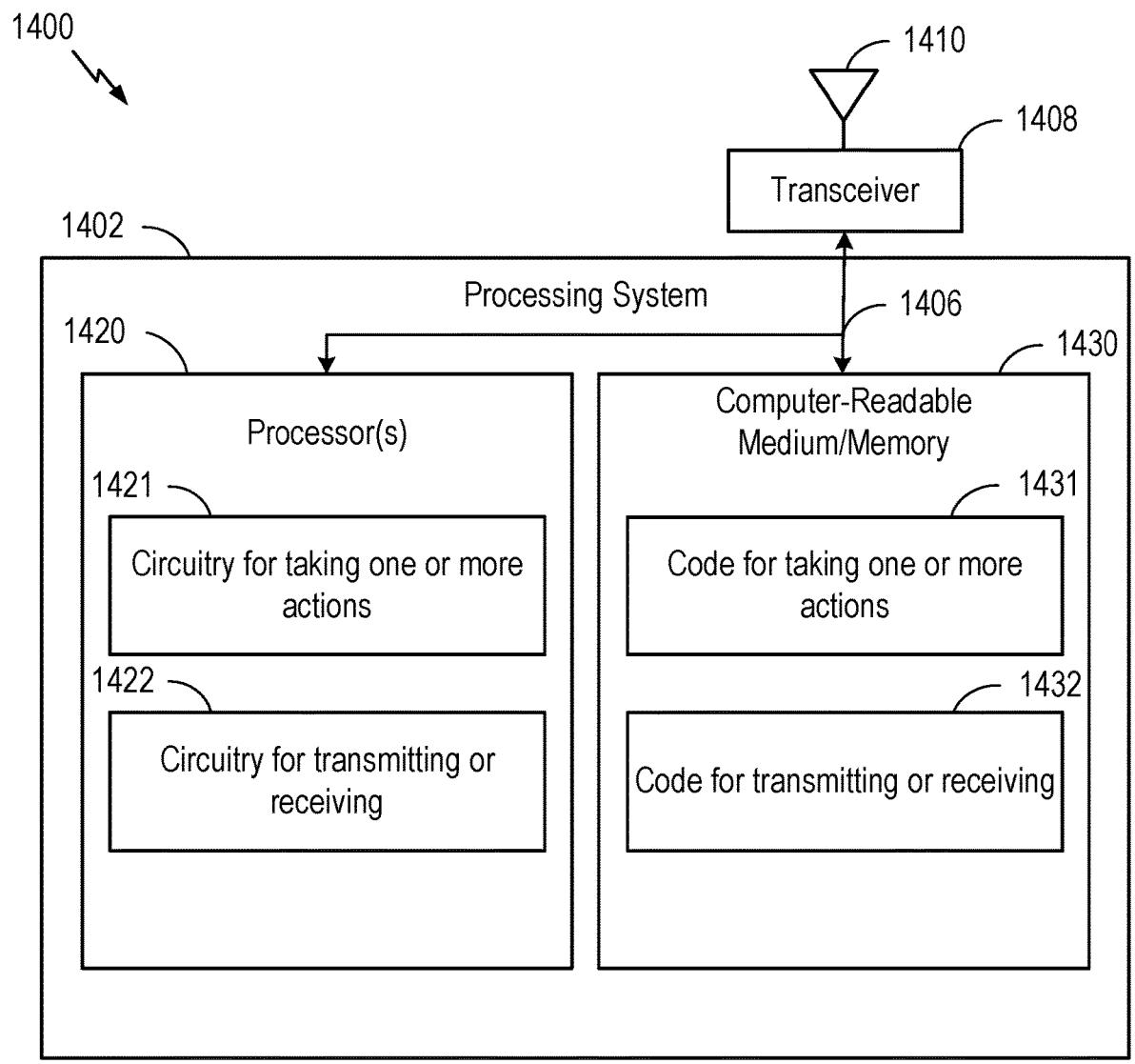
FIGS. 14 and 15 depict aspects of example communications devices.

FIG. 14 depicts an example communications device 1400 that includes various components operable, configured, or adapted to perform operations for the techniques disclosed herein, such as the operations depicted and described with respect to FIGS. 4 and 12-13. In some examples, communication device 1400 may be a base station 102 as described, for example with respect to FIGS. 1 and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIGS. 4 and 12-13, or other operations for performing the various techniques discussed herein for PUCCH repetition.

In the depicted example, computer-readable medium/memory 1430 stores code 1431 for taking one or more actions; and code 1432 for transmitting or receiving.

In the depicted example, the one or more processors 1420 include circuitry configured to implement the code stored in the computer-readable medium/memory 1430, including circuitry 1421 for taking one or more actions; and circuitry 1422 for transmitting or receiving.

Various components of communications device 1400 may provide means for performing the methods described herein, including with respect to FIGS. 4 and 12-13.

In some examples, means for transmitting or sending (or means for outputting for transmission) may include the transceivers 232 and/or antenna(s) 234 of the base station 102 illustrated in FIG. 2 and/or transceiver 1408 and antenna 1410 of the communication device 1400 in FIG. 14.

In some examples, means for receiving (or means for obtaining) may include the transceivers 232 and/or antenna(s) 234 of the base station illustrated in FIG. 2 and/or transceiver 1408 and antenna 1410 of the communication device 1400 in FIG. 14.

In some examples, means for determining, means for transmitting, and means for receiving may include various processing system components, such as: the one or more processors 1420 in FIG. 14, or aspects of the base station 102 depicted in FIG. 2, including receive processor 238, transmit processor 220, TX MIMO processor 230, and/or controller/processor 240 (including uplink control information component 241).

Notably, FIG. 14 is just use example, and many other examples and configurations of communication device 1400 are possible.

Figure 15:
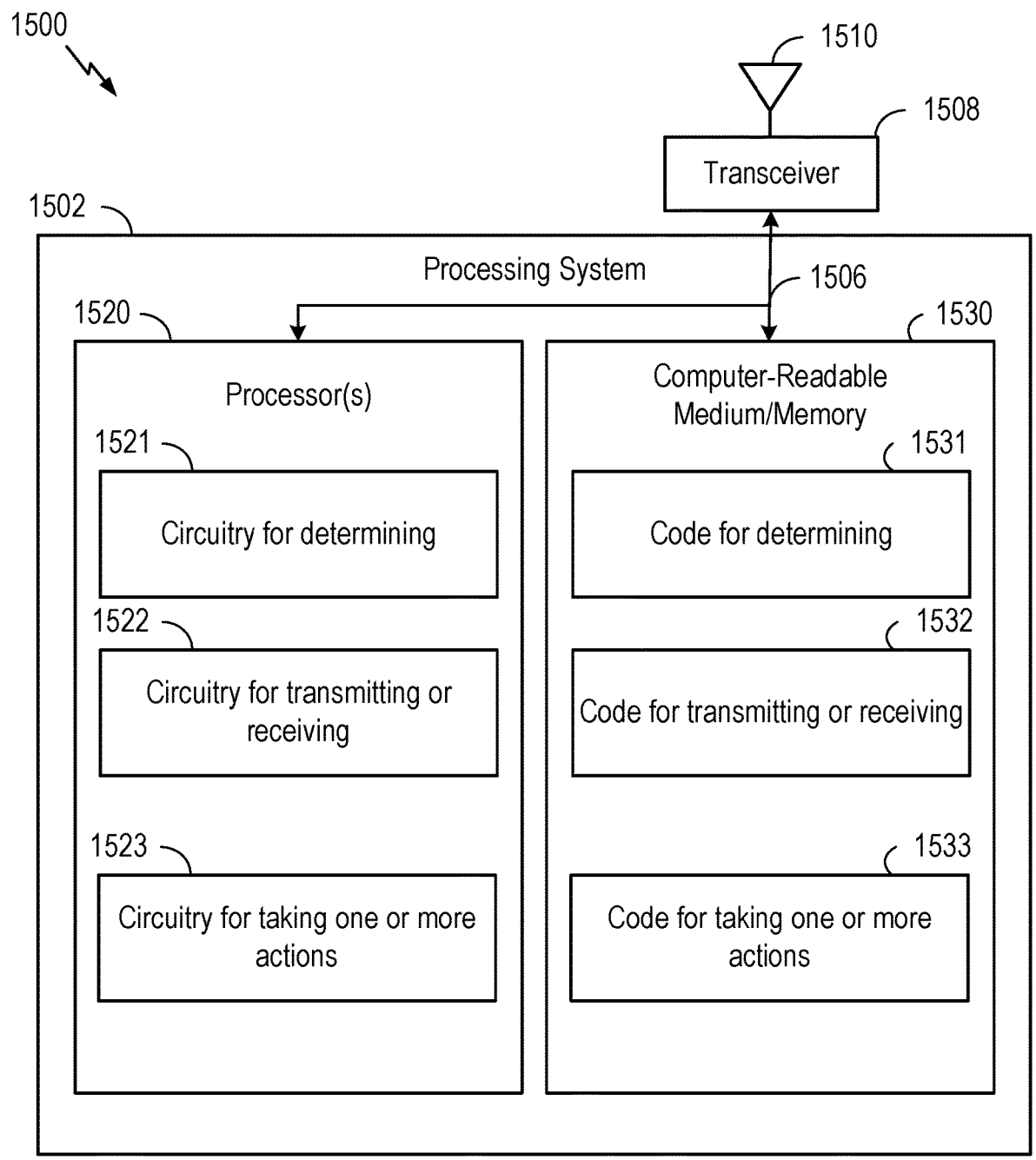

FIG. 15 depicts an example communications device 1500 that includes various components operable, configured, or adapted to perform operations for the techniques disclosed herein, such as the operations depicted and described with respect to FIG. 5. In some examples, communication device 1500 may be a user equipment 104 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIG. 5 or other operations for performing the various techniques discussed herein for PUCCH repetition.

In the depicted example, computer-readable medium/memory 1530 stores code 1531 for determining; code 1532 for transmitting or receiving; and code 1533 for taking one or more actions.

In the depicted example, the one or more processors 1520 include circuitry configured to implement the code stored in the computer-readable medium/memory 1530, including circuitry 1521 for determining; and circuitry 1522 for transmitting or receiving; and circuitry 1523 for taking one or more actions.

Various components of communications device 1500 may provide means for performing the methods described herein, including with respect to FIG. 5.

In some examples, means for transmitting or sending (or means for outputting for transmission) may include the transceivers 254 and/or antenna(s) 252 of the user equipment 104 illustrated in FIG. 2 and/or transceiver 1508 and antenna 1510 of the communication device 1500 in FIG. 15.

In some examples, means for receiving (or means for obtaining) may include the transceivers 254 and/or antenna(s) 252 of the user equipment 104 illustrated in FIG. 2 and/or transceiver 1508 and antenna 1510 of the communication device 1500 in FIG. 15.

In some examples, means for transmitting, means for receiving, and means for determining may include various processing system components, such as: the one or more processors 1520 in FIG. 15, or aspects of the user equipment 104 depicted in FIG. 2, including receive processor 258, transmit processor 264, TX MIMO processor 266, and/or controller/processor 280 (including uplink control information component 281).

Notably, FIG. 15 is just use example, and many other examples and configurations of communication device 1500 are possible.

Example Clauses

Implementation examples are described in the following numbered clauses:

Clause 1. A method for wireless communication by a user-equipment (UE), comprising: receiving, on a control channel, a configuration for an uplink control information (UCI) repetition; determining, in dependence on the control channel, whether to prioritize transmission of the UCI repetition over other uplink signaling, wherein a scheduled resource for transmission of the UCI repetition overlaps with resources for the other uplink signaling; and taking one or more actions associated with communication of the UCI repetition in accordance with the determination.

Clause 2. The method of Clause 1, wherein the other uplink signaling is on another uplink control channel.

Clause 3. The method of any one of Clauses 1-2, wherein taking the one or more actions includes deferring transmission of the UCI repetition based on the determination to not prioritize the UCI repetition over the other uplink signaling.

Clause 4. The method of any one of Clauses 1-3, wherein the control channel includes an indication to prioritize the UCI repetition over the other uplink signaling, and wherein the determining of whether to prioritize the transmission is based the indication.

Clause 5. The method of any one of Clauses 1-4, wherein the UCI repetition comprises a repetition of UCI having an acknowledgement (ACK) or negative acknowledgement (NACK) for a downlink data channel, and wherein the determining of whether to prioritize the transmission is further based on a priority associated the downlink data channel.

Clause 6. The method of Clause 5, wherein the priority associated the downlink data channel comprises a priority associated with a logical channel for the downlink data channel.

Clause 7. The method of any one of Clauses 5-6, wherein the determining of whether to prioritize the transmission comprises determining to prioritize the UCI repetition based on the priority of the downlink data channel being the same as a priority of the other uplink signaling.

Clause 8. The method of Clause 7, wherein the other uplink signaling comprises other UCI for another downlink data channel, and wherein the priority of the other uplink signaling comprises a priority of the other downlink data channel Clause 9. The method of any one of Clauses 5-8, further comprising receiving a configuration for semi-persistent scheduling (SPS) for another downlink data channel, wherein the other uplink signaling is on another control channel for the other downlink data channel, and wherein the determining of whether to prioritize the transmission comprises determining whether to prioritize the UCI repetition based on the configuration for the SPS.

Clause 10. The method of Clause 9, wherein the other uplink signaling on the other control channel comprises ACK or NACK for the other downlink data channel.

Clause 11. The method of any one of Clauses 1-10, wherein taking the one or more actions includes transmitting the UCI repetition using a resource that is non-overlapping with a resource used for transmission of other UCI.

Clause 12. A method for wireless communication by a user-equipment (UE), comprising: transmitting, on a control channel, a configuration for a uplink control information (UCI) repetition, the control channel indicating whether to prioritize transmission of the UCI repetition over other uplink signaling, wherein a scheduled resource for transmission of the UCI repetition overlaps with resources for the other uplink signaling; and taking one or more actions associated with communication of the UCI repetition in accordance with the indication on the control channel.

Clause 13. The method of Clause 12, wherein the other uplink signaling is on another uplink control channel.

Clause 14. The method of any one of Clauses 12-13, wherein taking the one or more actions includes deferring reception of the UCI repetition based on the control channel indicating to not prioritize the UCI repetition over the other uplink signaling.

Clause 15. The method of any one of Clauses 12-14, wherein the control channel indicates to prioritize the UCI repetition over the other uplink signaling.

Clause 16. The method of any one of Clauses 12-15, wherein the UCI repetition comprises a repetition of UCI having an acknowledgement (ACK) or negative acknowledgement (NACK) for a downlink data channel, and wherein the indication of whether to prioritize the transmission is based on a priority associated the downlink data channel.

Clause 17. The method of Clause 16, wherein the priority associated the downlink data channel comprises a priority associated with a logical channel for the downlink data channel.

Clause 18. The method of any one of Clauses 16-17, wherein the indication of whether to prioritize the transmission comprises indicating to prioritize the UCI repetition based on the priority of the downlink data channel being the same as a priority of the other uplink signaling.

Clause 19. The method of Clause 18, wherein the other uplink signaling comprises other UCI for another downlink data channel, and wherein the priority of the other uplink signaling comprises a priority of the other downlink data channel Clause 20. The method of any one of Clauses 16-19, further comprising transmitting a configuration for semi-persistent scheduling (SPS) for another downlink data channel, wherein the other uplink signaling is on another control channel for the other downlink data channel, and wherein the configuration for the SPS indicates whether to prioritize the UCI repetition.

Clause 21. The method of Clause 20, wherein the other uplink signaling on the other control channel comprises ACK or NACK for the other downlink data channel.

Clause 22. The method of any one of Clauses 12-21, wherein taking the one or more actions includes receiving the UCI repetition using a resource that is non-overlapping with a resource used for transmission of other UCI.

Clause 23: An apparatus, comprising: a memory comprising executable instructions; one or more processors configured to execute the executable instructions and cause the apparatus to perform a method in accordance with any one of Clauses 1-22.

Clause 24: An apparatus, comprising means for performing a method in accordance with any one of Clauses 1-22.

Clause 25: A non-transitory computer-readable medium comprising executable instructions that, when executed by one or more processors of an apparatus, cause the apparatus to perform a method in accordance with any one of Clauses 1-22.

Clause 26: A computer program product embodied on a computer-readable storage medium comprising code for performing a method in accordance with any one of Clauses 1-22.

Clause 27: A method of wireless communication performed by a user equipment (UE), comprising: receiving an indication of a first uplink control channel resource associated with a semi-persistent scheduling (SPS) occasion; receiving a dynamic indication of one or more repetitions of an uplink control channel message, wherein a second uplink control channel resource of a repetition, of the one or more repetitions, at least partially overlaps in a time domain with the first uplink control channel resource; and transmitting uplink control information using only one of the first uplink control channel resource or the second uplink control channel resource based at least in part on a first priority level of the SPS occasion and a second priority level of a downlink message associated with the uplink control channel message.

Clause 28: The method of Clause 27, wherein transmitting the uplink control information comprises: transmitting the repetition of the uplink control channel message using the second uplink control channel resource based at least in part on the first priority level and the second priority level; and refraining from monitoring for communications during the SPS occasion based at least in part on the second uplink control channel resource at least partially overlapping in the time domain with the first uplink control channel resource.

Clause 29: The method of any of Clauses 27-28, wherein transmitting the uplink control information comprises transmitting the repetition of the uplink control channel message using the second uplink control channel resource based at least in part on the second priority level having a higher priority than the first priority level.

Clause 30: The method of any of Clauses 27-29, wherein receiving the dynamic indication of the one or more repetitions of the uplink control channel message indicates an elevated priority level associated with the second priority level.

Clause 31: The method of any of Clauses 27-, wherein transmitting the uplink control information comprises transmitting uplink control information associated with the SPS occasion using the first uplink control channel resource based at least in part on the first priority level having a higher priority than the second priority level.

Clause 32: The method of any of any of Clauses 27-31, wherein one or more rules indicate whether to transmit using the first uplink control channel resource or the second uplink control channel resource based at least in part on the first priority level and the second priority level.

Clause 33: The method of Clause 32, wherein receiving the indication of the first uplink control channel resource comprises receiving an SPS configuration that includes the indication of the first uplink control channel resource associated with the SPS occasion, the SPS configuration indicating the one or more rules.

Clause 34: The method of Clause 32, further comprising receiving a configuration for uplink control channel resource sets, the configuration indicating the one or more rules.

Clause 35: The method of any of Clauses 27-34, wherein the first uplink control channel resource is associated with a first uplink control channel resource set and the second uplink control channel resource is associated with a second uplink control channel resource set, and wherein transmitting the uplink control information comprises transmitting the uplink control information using only one of the first uplink control channel resource or the second uplink control channel resource based at least in part on the first uplink control channel resource set and the second uplink control channel resource set.

Clause 36: The method of Clause 35, wherein the first uplink control channel resource set and the second uplink control channel resource set are a same uplink control channel resource set.

Clause 37: The method of any of Clauses 35-36, wherein a first time domain resource allocation associated with the first uplink control channel resource set at least partially overlaps with a second time domain resource allocation associated with the second uplink control channel resource set.

Clause 38: The method of any of Clauses 35-37, wherein transmitting the uplink control information comprises transmitting the uplink control information using only one of the first uplink control channel resource or the second uplink control channel resource based at least in part on a first priority level associated with the first uplink control channel resource set and a second priority level associated with the second uplink control channel resource set.

Clause 39: The method of any of Clauses 27-38, wherein transmitting the uplink control information comprises: transmitting the repetition of the uplink control channel message using the second uplink control channel resource based at least in part on the first priority level and the second priority level; and refraining from monitoring for communications during a set of SPS occasions that includes the SPS occasion based at least in part on the second uplink control channel resource at least partially overlapping in the time domain with the first uplink control channel resource.

Clause 40: The method of Clause 39, wherein refraining from monitoring for communications during the set of SPS occasions comprises refraining from monitoring for communications during SPS occasions included in the set of SPS occasions for an amount of time, wherein the amount of time is based at least in part on a validity period associated with the dynamic indication of the one or more repetitions of the uplink control channel message.

Clause 41: The method of any of Clauses 27-40, wherein the uplink control channel message is associated with a downlink shared channel message.

Clause 42: The method of any of Clauses 27-41, wherein the uplink control channel message is associated with another SPS occasion.

Clause 43: A method of wireless communication performed by a base station, comprising: transmitting an indication of a first uplink control channel resource associated with a semi-persistent scheduling (SPS) occasion; transmitting a dynamic indication of one or more repetitions of an uplink control channel message, wherein a second uplink control channel resource associated with a repetition, of the one or more repetitions, at least partially overlaps in a time domain with the first uplink control channel resource; and receiving uplink control information using only one of the first uplink control channel resource or the second uplink control channel resource based at least in part on a first priority level of the SPS occasion and a second priority level of a downlink message associated with the uplink control channel message.

Clause 44: The method of Clause 43, wherein receiving the uplink control information comprises: receiving the repetition of the uplink control channel message using the second uplink control channel resource based at least in part on the first priority level and the second priority level; and refraining from transmitting a downlink message during the SPS occasion based at least in part on the second uplink control channel resource at least partially overlapping in the time domain with the first uplink control channel resource.

Clause 45: The method of any of Clauses 43-44, wherein receiving the uplink control information comprises receiving the repetition of the uplink control channel message using the second uplink control channel resource based at least in part on the second priority level having a higher priority than the first priority level.

Clause 46: The method of any of Clauses 43-45, wherein transmitting the dynamic indication of the one or more repetitions of the uplink control channel message indicates an elevated priority level associated with the second priority level.

Clause 47: The method of any of Clauses 43-44, wherein receiving uplink control information comprises receiving uplink control information associated with the SPS occasion using the first uplink control channel resource based at least in part on the first priority level having a higher priority than the second priority level.

Clause 48: The method of any of any of Clauses 43-47, wherein one or more rules indicate whether the repetition or the uplink control information using the first uplink control channel resource is to be received based at least in part on the first priority level and the second priority level.

Clause 49: The method of Clause 48, wherein transmitting the indication of the first uplink control channel resource comprises transmitting an SPS configuration that includes the indication of the first uplink control channel resource associated with the SPS occasion, the SPS configuration indicating the one or more rules.

Clause 50: The method of Clause 48, further comprising transmitting a configuration for uplink control channel resource sets, the configuration indicating the one or more rules.

Clause 51: The method of any of Clauses 43-50, wherein the first uplink control channel resource is associated with a first uplink control channel resource set and the second uplink control channel resource is associated with a second uplink control channel resource set, and wherein receiving the uplink control information comprises receiving the uplink control information using only one of the first uplink control channel resource or the second uplink control channel resource based at least in part on the first uplink control channel resource set and the second uplink control channel resource set.

Clause 52: The method of Clause 51, wherein the first uplink control channel resource set and the second uplink control channel resource set are a same uplink control channel resource set.

Clause 53: The method of any of Clauses 51-52, wherein a first time domain resource allocation associated with the first uplink control channel resource set at least partially overlaps with a second time domain resource allocation associated with the second uplink control channel resource set.

Clause 54: The method of any of Clauses 51-53, wherein receiving the uplink control information comprises receiving the uplink control information using only one of the first uplink control channel resource or the second uplink control channel resource based at least in part on a first priority level associated with the first uplink control channel resource set and a second priority level associated with the second uplink control channel resource set.

Clause 55: The method of any of Clauses 43-54, wherein receiving the uplink control information comprises: receiving the repetition of the uplink control channel message using the second uplink control channel resource based at least in part on the first priority level and the second priority level; and refraining from transmitting downlink messages during a set of SPS occasions that includes the SPS occasion based at least in part on the second uplink control channel resource at least partially overlapping in the time domain with the first uplink control channel resource.

Clause 56: The method of Clause 55, wherein refraining from transmitting the downlink messages during the set of SPS occasions comprises refraining from transmitting the downlink messages during SPS occasions included in the set of SPS occasions for an amount of time, wherein the amount of time is based at least in part on a validity period associated with the dynamic indication of the one or more repetitions of the uplink control channel message.

Clause 57: The method of any of Clauses 43-56, wherein the uplink control channel message is associated with a downlink shared channel message.

Clause 58: The method of any of Clauses 43-57, wherein the uplink control channel message is associated with another SPS occasion.

Clause 59: An apparatus for wireless communication at a device, comprising a processor; memory coupled with the processor; and instructions stored in the memory and executable by the processor to cause the apparatus to perform the method of one or more of Clauses 1-58.

Clause 60: A device for wireless communication, comprising a memory and one or more processors coupled to the memory, the memory and the one or more processors configured to perform the method of one or more of Clauses 1-58.

Clause 61: An apparatus for wireless communication, comprising at least one means for performing the method of one or more of Clauses 1-58.

Clause 62: A non-transitory computer-readable medium storing code for wireless communication, the code comprising instructions executable by a processor to perform the method of one or more of Clauses 1-58.

Clause 63: A non-transitory computer-readable medium storing a set of instructions for wireless communication, the set of instructions comprising one or more instructions that, when executed by one or more processors of a device, cause the device to perform the method of one or more of Clauses 1-58.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). ABS for a macro cell may be referred to as a macro BS. ABS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of techniques for control information transmission on a data channel in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user-equipment (UE), comprising:
    a memory comprising computer-executable instructions; and
    one or more processors configured to execute the computer-executable instructions and cause the UE to:
        receive, on a control channel, a configuration for an uplink control information (UCI) repetition;
        determine, in dependence on the control channel, whether to prioritize transmission of the UCI repetition over other uplink signaling, wherein a scheduled resource for transmission of the UCI repetition overlaps with resources for the other uplink signaling; and
        take one or more actions associated with communication of the UCI repetition in accordance with the determination, wherein the one or more actions include deferring transmission of the UCI repetition when the determination is to not prioritize the UCI repetition over the other uplink signaling.

2. The apparatus of claim 1, wherein the other uplink signaling is on another uplink control channel.

3. The apparatus of claim 1, wherein the control channel includes an indication to prioritize the UCI repetition over the other uplink signaling, and wherein the determining of whether to prioritize the transmission is based the indication.

4. The apparatus of claim 1, wherein the UCI repetition comprises a repetition of UCI having an acknowledgement (ACK) or negative acknowledgement (NACK) for a downlink data channel, and wherein the determination of whether to prioritize the transmission is further based on a priority associated the downlink data channel.

5. The apparatus of claim 4, wherein the priority associated the downlink data channel comprises a priority associated with a logical channel for the downlink data channel.

6. The apparatus of claim 4, wherein the determination of whether to prioritize the transmission comprises a determination to prioritize the UCI repetition based on the priority of the downlink data channel being the same as a priority of the other uplink signaling.

7. The apparatus of claim 6, wherein the other uplink signaling comprises other UCI for another downlink data channel, and wherein the priority of the other uplink signaling comprises a priority of the other downlink data channel.

8. The apparatus of claim 4, wherein the one or more processors are further configured to cause the UE to receive a configuration for semi-persistent scheduling (SPS) for another downlink data channel, wherein the other uplink signaling is on another control channel for the other downlink data channel, and wherein the determination of whether to prioritize the transmission comprises a determination of whether to prioritize the UCI repetition based on the configuration for the SPS.

9. The apparatus of claim 8, wherein the other uplink signaling on the other control channel comprises ACK or NACK for the other downlink data channel.

10. The apparatus of claim 1, wherein the one or more actions include transmission of the UCI repetition using a resource that is non-overlapping with a resource used for transmission of other UCI.

11. An apparatus for wireless communication at a network entity, comprising:
  a memory comprising computer-executable instructions; and
  one or more processors configured to execute the computer-executable instructions and cause the network entity to:
    transmit, on a control channel, a configuration for a uplink control information (UCI) repetition, the control channel indicating whether to prioritize transmission of the UCI repetition over other uplink signaling, wherein a scheduled resource for transmission of the UCI repetition overlaps with resources for the other uplink signaling; and
    take one or more actions associated with communication of the UCI repetition in accordance with the indication on the control channel, wherein the one or more actions include deferring reception of the UCI repetition when the control channel indicates to not prioritize the UCI repetition over the other uplink signaling.

12. The apparatus of claim 11, wherein the other uplink signaling is on another uplink control channel.

13. The apparatus of claim 11, wherein the control channel indicates to prioritize the UCI repetition over the other uplink signaling.

14. The apparatus of claim 11, wherein the UCI repetition comprises a repetition of UCI having an acknowledgement (ACK) or negative acknowledgement (NACK) for a downlink data channel, and wherein the indicating of whether to prioritize the transmission is based on a priority associated the downlink data channel.

15. The apparatus of claim 14, wherein the priority associated the downlink data channel comprises a priority associated with a logical channel for the downlink data channel.

16. The apparatus of claim 14, wherein the indicating of whether to prioritize the transmission comprises indicating to prioritize the UCI repetition based on the priority of the downlink data channel being the same as a priority of the other uplink signaling.

17. The apparatus of claim 16, wherein the other uplink signaling comprises other UCI for another downlink data channel, and wherein the priority of the other uplink signaling comprises a priority of the other downlink data channel.

18. The apparatus of claim 14, wherein the one or more processors are further configured to cause the network entity to transmit a configuration for semi-persistent scheduling (SPS) for another downlink data channel, wherein the other uplink signaling is on another control channel for the other downlink data channel, and wherein the configuration for the SPS indicates whether to prioritize the UCI repetition.

19. The apparatus of claim 18, wherein the other uplink signaling on the other control channel comprises ACK or NACK for the other downlink data channel.

20. The apparatus of claim 11, wherein the one or more actions include receiving the UCI repetition using a resource that is non-overlapping with a resource used for transmission of other UCI.

21. A method for wireless communication by a user-equipment (UE), comprising:
  receiving, on a control channel, a configuration for an uplink control information (UCI) repetition;
  determining, in dependence on the control channel, whether to prioritize transmission of the UCI repetition over other uplink signaling, wherein a scheduled resource for transmission of the UCI repetition overlaps with resources for the other uplink signaling; and
  taking one or more actions associated with communication of the UCI repetition in accordance with the determination, wherein the one or more actions include deferring transmission of the UCI repetition when the determination is to not prioritize the UCI repetition over the other uplink signaling.

22. A method for wireless communication by a network entity, comprising:
  transmitting, on a control channel, a configuration for a uplink control information (UCI) repetition, the control channel indicating whether to prioritize transmission of the UCI repetition over other uplink signaling, wherein a scheduled resource for transmission of the UCI repetition overlaps with resources for the other uplink signaling; and
  taking one or more actions associated with communication of the UCI repetition in accordance with the indication on the control channel, wherein the one or more actions include deferring reception of the UCI repetition when the control channel indicates to not prioritize the UCI repetition over the other uplink signaling.

* * * * *